US007861060B1

(12) United States Patent
Nickolls et al.

(10) Patent No.: US 7,861,060 B1
(45) Date of Patent: Dec. 28, 2010

(54) PARALLEL DATA PROCESSING SYSTEMS AND METHODS USING COOPERATIVE THREAD ARRAYS AND THREAD IDENTIFIER VALUES TO DETERMINE PROCESSING BEHAVIOR

(75) Inventors: John R. Nickolls, Los Altos, CA (US); Stephen D. Lew, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1412 days.

(21) Appl. No.: 11/305,178

(22) Filed: Dec. 15, 2005

(51) Int. Cl.
*G06F 15/16* (2006.01)
(52) U.S. Cl. ........................................................ 712/22
(58) Field of Classification Search ...................... 712/22
See application file for complete search history.

(56) References Cited

U.S. PATENT DOCUMENTS

| | | | |
|---|---|---|---|
| 5,109,514 A | 4/1992 | Garner et al. |
| 5,355,508 A | 10/1994 | Kan |
| 5,434,995 A | 7/1995 | Oberlin et al. |
| 5,450,603 A | 9/1995 | Davies |
| 5,504,678 A | 4/1996 | Juszczak et al. |
| 5,539,898 A | 7/1996 | Trevett et al. |
| 5,592,628 A | 1/1997 | Ueno et al. |
| 5,678,062 A | 10/1997 | Okada et al. |
| 5,721,921 A | 2/1998 | Kessler et al. |
| 5,740,402 A | 4/1998 | Bratt et al. |
| 5,778,416 A | 7/1998 | Harrison et al. |
| 5,854,758 A | 12/1998 | Kosuda et al. |
| 5,928,351 A | 7/1999 | Horie et al. |
| 5,973,705 A | 10/1999 | Narayanaswami |
| 6,085,303 A | 7/2000 | Thorson et al. |
| 6,088,714 A | 7/2000 | Wadleigh |
| 6,205,519 B1 | 3/2001 | Aglietti et al. |
| 6,216,174 B1 | 4/2001 | Scott et al. |
| 6,233,599 B1 * | 5/2001 | Nation et al. ................ 718/102 |
| 6,282,585 B1 | 8/2001 | Batten et al. |
| 6,330,584 B1 | 12/2001 | Joffe et al. |
| 6,366,998 B1 | 4/2002 | Mohamed |
| 6,418,442 B1 | 7/2002 | Dwyer |
| 6,532,484 B1 | 3/2003 | Kechriotis |
| 6,897,871 B1 | 5/2005 | Morein et al. |

(Continued)

OTHER PUBLICATIONS

U.S. Appl. No. 11/311,997, Office Action dated Jan. 21, 2010, 12 pages.

(Continued)

*Primary Examiner*—Eddie P Chan
*Assistant Examiner*—Keith Vicary
(74) *Attorney, Agent, or Firm*—Townsend and Townsend and Crew LLP

(57) ABSTRACT

Parallel data processing systems and methods use cooperative thread arrays (CTAs), i.e., groups of multiple threads that concurrently execute the same program on an input data set to produce an output data set. Each thread in a CTA has a unique identifier (thread ID) that can be assigned at thread launch time. The thread ID controls various aspects of the thread's processing behavior such as the portion of the input data set to be processed by each thread, the portion of an output data set to be produced by each thread, and/or sharing of intermediate results among threads. Mechanisms for loading and launching CTAs in a representative processing core and for synchronizing threads within a CTA are also described.

18 Claims, 10 Drawing Sheets

U.S. PATENT DOCUMENTS

| | | | |
|---|---|---|---|
| 6,918,044 | B1 | 7/2005 | Robins et al. |
| 6,925,643 | B2 | 8/2005 | Hokenek et al. |
| 7,047,268 | B2 | 5/2006 | Harley et al. |
| 7,062,523 | B1 | 6/2006 | Hoffman et al. |
| 7,073,039 | B2 | 7/2006 | Kirsch |
| 7,360,035 | B2 | 4/2008 | Jenkins et al. |
| 7,412,586 | B1 | 8/2008 | Rajopadhye et al. |
| 7,490,190 | B2 | 2/2009 | Skull |
| 7,584,342 | B1 | 9/2009 | Nordquist et al. |
| 2002/0062352 | A1 | 5/2002 | Asano et al. |
| 2002/0107990 | A1 | 8/2002 | Johnson et al. |
| 2002/0174318 | A1 | 11/2002 | Stuttard et al. |
| 2002/0196669 | A1 | 12/2002 | Hsu et al. |
| 2003/0056200 | A1 | 3/2003 | Li et al. |
| 2003/0135535 | A1 | 7/2003 | Hoeflinger et al. |
| 2003/0196030 | A1 | 10/2003 | Elliott et al. |
| 2004/0073772 | A1* | 4/2004 | Hokenek et al. ............... 712/1 |
| 2004/0181503 | A1 | 9/2004 | Moseler et al. |
| 2005/0097258 | A1 | 5/2005 | Schreter |
| 2005/0108720 | A1 | 5/2005 | Cervini |
| 2005/0149602 | A1 | 7/2005 | Venkatachalam et al. |
| 2005/0160127 | A1 | 7/2005 | Swartzlander et al. |
| 2005/0226079 | A1 | 10/2005 | Zhu et al. |
| 2005/0256917 | A1 | 11/2005 | Harley |
| 2005/0283786 | A1 | 12/2005 | Dettinger et al. |
| 2005/0289299 | A1* | 12/2005 | Nunamaker et al. ......... 711/122 |
| 2006/0143415 | A1 | 6/2006 | Naik |
| 2006/0248535 | A1 | 11/2006 | Grover |
| 2006/0256782 | A1 | 11/2006 | Shimizu |
| 2007/0013702 | A1 | 1/2007 | Hiroi et al. |
| 2007/0033369 | A1 | 2/2007 | Kasama et al. |
| 2007/0208795 | A1 | 9/2007 | Nakanishi |
| 2007/0220517 | A1 | 9/2007 | Lippett |
| 2007/0239815 | A1 | 10/2007 | Cousineau et al. |
| 2008/0140994 | A1 | 6/2008 | Khailany et al. |
| 2008/0184211 | A1 | 7/2008 | Nickolls et al. |
| 2009/0300621 | A1* | 12/2009 | Mantor et al. ............... 718/100 |
| 2009/0307704 | A1* | 12/2009 | Munshi et al. .............. 718/104 |

OTHER PUBLICATIONS

U.S. Appl. No. 11/554,552, Office Action dated Oct. 14, 2009, 15 pages.

Eggers et al. "Simultaneous multithreading: A platform for next-generation processors" IEEE Micro, Sep./Oct. 1997(vol. 17, No. 5) pp. 12-19.

U.S. Appl. No. 11/554,563, Office Action dated Sep. 14, 2009, 11 pages.

U.S. Appl. No. 11/554,563, Office Action dated Dec. 22, 2008, 17 pages.

Garg et al., "Architectural support for inter-stream communication in a MSIMD system"; High-Performance Computer Architecture, 1995. Proceedings First IEEE Symposium on; Publication Date: 1995; pp. 348-357.

U.S. Appl. No. 11/554,546, Office Action dated Aug. 5, 2009, 12 pages.

U.S. Appl. No. 11/554,546, Office Action dated Jan. 25, 2010, 12 pages.

Ortiz; Teaching the SIMD Execution Model: Assembling a Few Parallel Programming Skills; Feb. 2003; SIGCSE'03; ACM.

U.S. Appl. No. 11/303,780, Office Action mailed May 7, 2008, 15 pages.

U.S. Appl. No. 11/303,780, Office Action mailed Dec. 31, 2008, 13 pages.

U.S. Appl. No. 11/424,514, Notice of Allowance dated Oct. 16, 2009, 7 pages.

U.S. Appl. No. 11/424,511, Office Action dated Oct. 16, 2009, 7 pages.

Feitelson, "Packing Schemes for Gang Scheduling", Proceedings of the Workshop on Job Scheduling Strategies for Parallel Processing, Lecture Notes in Computer Science, vol. 1162, 1996, pp. 89-110.

Mersenne Twister Algorithm (last modified on Feb. 26, 2004).

U.S. Appl. No. 11/608,762, Office Action dated Oct. 13, 2009, 8 pages.

U.S. Appl. No. 11/554,542, Office Action dated Jul. 17, 2009, 8 pages.

Johnson et al., "A Distributed Hardware Mechanism for Process Synchronization on Shared-Bus Multiprocessors," 1994; IEEE Computer Society; ICPP '94, pp. 268-275.

Office Action dated Jun. 3, 2009, U.S. Appl. No. 11/554,552, filed Oct. 30, 2006, 14 pages.

Garzia (ATI Stream Computing) Seminar on General-Purpose computing on GPUs, 2009.

Brook+Release Notes (Brook+Release Notes, Stream Computing SDK 1.4), 2009.

AMD Developer Forums (Thread title: LDS: More info requested), 2008.

Derek Wilson (Anandtech: OpenCL 1.0: The Road to Pervasive GPU Computing), Dec. 31, 2008.

Aaftab Munshi (The OpenCl Specification) May 16, 2009.

User Guide (ATI Stream Computing User Guide); first two pages attached; Apr. 2009.

Technical Overview (ATI Stream Computing Technical Overview); 2009.

B3D Forum (Beyond3D Forums, thread title: GPGPU capabilities in Radeon HD 3000/4000; 2008.

Doom9's Forum (Doom 9 Forum, thread title "Nvidia submits its OpenCL 1.0 drivers for certification"), 2009.

U.S. Appl. No. 11/305,479, Notice of Allowance mailed Jul. 6, 2009, 14 pages.

U.S. Appl. No. 11/554,552, Office Action dated Mar. 23, 2010, 16 pages.

U.S. Appl. No. 11/554,546, Office Action mailed May 26, 2010, 13 pages.

Mersenne Twister Algorithm (last modified on Feb. 26, 2004), downloaded on Sep. 29, 2009 from http://www.umiacs.umd.edu/-yangcj/mtmd.h U.S. Appl. No. 11/303,780, Notice of Allowance dated Jul. 15, 2010, 2 pages.

U.S. Appl. No. 11/608,762, Final Office Action mailed Mar. 31, 2010, 10 pages.

* cited by examiner

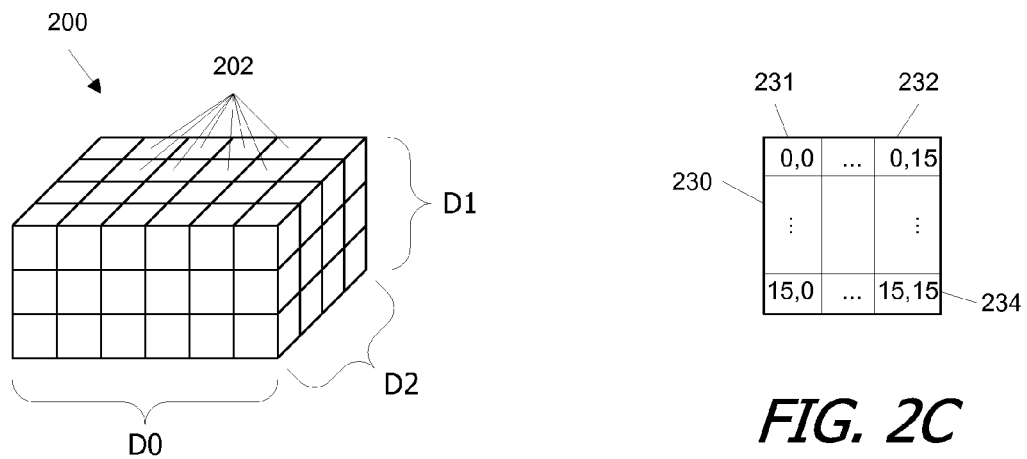
FIG. 2A
FIG. 2C
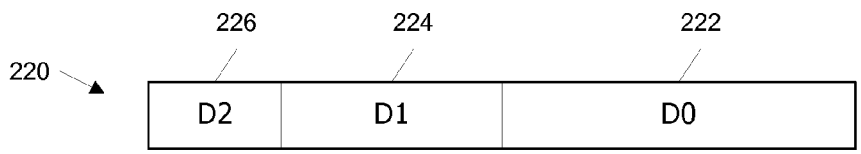
FIG. 2B
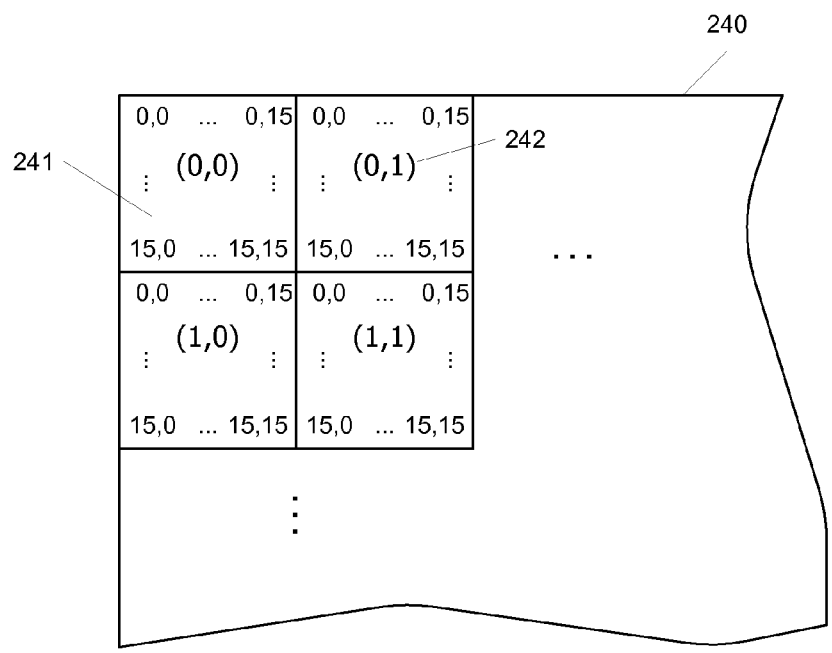
FIG. 2D

PARALLEL DATA PROCESSING SYSTEMS AND METHODS USING COOPERATIVE THREAD ARRAYS AND THREAD IDENTIFIER VALUES TO DETERMINE PROCESSING BEHAVIOR

CROSS-REFERENCES TO RELATED APPLICATIONS

The present disclosure is related to the following commonly-assigned co-pending U.S. Patent Applications: application Ser. No. 11/305,479, filed of even date herewith, entitled "Parallel Data Processing Systems and Methods Using Cooperative Thread Arrays and SIMD Instruction Issue"; and application Ser. No. 11/303,780, filed of even date herewith, entitled "Synchronization of Threads in a Cooperative Thread Array." The respective disclosures of these applications are incorporated herein by reference for all purposes.

BACKGROUND OF THE INVENTION

The present invention relates in general to parallel data processing, and in particular to parallel data processing methods using arrays of threads that are capable of sharing data, including intermediate results, with other threads in a thread-specific manner.

Parallel processing techniques enhance throughput of a processor or multiprocessor system when multiple independent computations need to be performed. A computation can be divided into tasks, with each task being performed as a separate thread. (As used herein, a "thread" refers generally to an instance of execution of a particular program using particular input data.) Parallel threads are executed simultaneously using different processing engines, allowing more processing work to be completed in a given amount of time.

Numerous existing processor architectures support parallel processing. The earliest such architectures used multiple discrete processors networked together. More recently, multiple processing cores have been fabricated on a single chip. These cores are controlled in various ways. In some instances, known as multiple-instruction, multiple data (MIMD) machines, each core independently fetches and issues its own instructions to its own processing engine (or engines). In other instances, known as single-instruction, multiple-data (SIMD) machines, a core has a single instruction unit that issues the same instruction in parallel to multiple processing engines, which execute the instruction on different input operands. SIMD machines generally have advantages in chip area (since only one instruction unit is needed) and therefore cost; the downside is that parallelism is only available to the extent that multiple instances of the same instruction can be executed concurrently.

Graphics processors have used very wide SIMD architectures to achieve high throughput in image-rendering applications. Such applications generally entail executing the same programs (vertex shaders or pixel shaders) on large numbers of objects (vertices or primitives). Since each object is processed independently of all others using the same sequence of operations, a SIMD architecture provides considerable performance enhancement at reasonable cost. Typically, a GPU includes one SIMD core (e.g., 200 threads wide) that executes vertex shader programs, and another SIMD core of comparable size that executes pixel shader programs. In high-end GPUs, multiple sets of SIMD cores are sometimes provided to support an even higher degree of parallelism.

Parallel processing architectures often require that parallel threads be independent of each other, i.e., that no thread uses data generated by another thread executing in parallel or concurrently with it. In other cases, limited data-sharing capacity is available. For instance, some SIMD and MIMD machines provide a shared memory or global register file that is accessible to all of the processing engines. One engine can write data to a register that is subsequently read by another processing engine. Some parallel machines pass messages (including data) between processors using an interconnection network or shared memory. In other architectures (e.g., a systolic array), subsets of processing engines have shared registers, and two threads executing on engines with a shared register can share data by writing it to that register. In such instances, the programmer is required to specifically program each thread for data sharing, so that different threads are no longer executing the same program.

It would therefore be desirable to provide systems and methods for parallel processing that facilitate sharing of data among concurrently-executing threads.

BRIEF SUMMARY OF THE INVENTION

Embodiments of the present invention provide data processing systems and methods that use cooperative thread arrays (CTAs) to perform computations. As used herein, a "cooperative thread array," or "CTA," is a group of multiple threads that concurrently execute the same program on an input data set to produce an output data set. Each thread in a CTA has a unique identifier (thread ID) assigned at thread launch time that controls various aspects of the thread's processing behavior. For instance, a thread ID may be used to determine which portion of the input data set a thread is to process, to identify one or more other threads with which a given thread is to share an intermediate result, and/or to determine which portion of the output data set the thread is to compute or write.

CTAs can be executed in a variety of processing architectures, including sequential single processors, parallel processors, multithreaded processors, and any architecture that can support multiple concurrent threads and that provides at least some shared memory, interconnection network, or other technology that allows threads to communicate with each other. In some embodiments, CTAs are executed using a processing core of a graphics processor that has multiple parallel processing engines, each capable of supporting multiple concurrent threads. The threads are advantageously executed in SIMD (single instruction, multiple data) groups, with one thread of the group being associated with each processing engine. A single instruction unit issues an instruction to an entire SIMD group in parallel, and each processing engine executes the instruction in the context of its thread of the current SIMD group; instructions for different SIMD groups can be issued in any order. By executing each instruction in the appropriate context, each processing engine executes one thread in each of multiple concurrent SIMD groups.

Thread IDs are advantageously assigned as the threads of a CTA are launched, and the interface logic for the processing core is advantageously configured to automatically assign thread IDs to threads as the threads are being launched. Automatic assignment of thread IDs eliminates the need for an application programmer to explicitly configure each thread. Instead, the programmer can simply define the number of threads in the CTA and the operations each thread is to do; the particular manner in which the CTA is executed is advantageously made transparent to the programmer.

According to one aspect of the present invention, a computer implemented method for processing data includes defining, in a processor, a thread array having multiple threads, each thread configured to execute a same program on an input data set. In some embodiments, the program represents a unit of a data parallel decomposition of a data processing algorithm. The processor assigns each of the threads in the thread array a unique thread identifier (which can be, e.g., a one-dimensional or multidimensional identifier). The processor executes the threads in the thread array concurrently with each other; during execution, each thread uses the unique thread identifier to determine at least one processing behavior. Any processor, including but not limited to a graphics processor, may be used to implement the method. Parallel and multithreaded processors can execute multiple threads of a CTA in parallel for enhanced performance.

Various processing behaviors can be determined using the thread identifier. In one embodiment, each thread uses the unique thread identifier to determine a subset of the input data set to process; some or all of the subsets may be overlapping. In another embodiment, each thread uses the unique identifier to determines a subset of an output data set to produce.

In one embodiment, the input data set is loaded into a shared memory accessible to all of the plurality of threads (such as a global register file of the processor or other on-chip shared memory), and during the act of executing the plurality of threads, the thread identifier of a thread is used to determine a location in the shared memory of input data to be read. In some embodiments, the thread identifier may be used to determine a location in the shared memory or other memory to which output data, including intermediate and/or final result data, is to be written.

In some embodiments, during the act of executing the threads, an intermediate result from a first one of the threads is shared with a second one of the threads based on the respective thread identifiers of the first and second threads. The consuming thread is advantageously synchronized with the producing thread prior to sharing the intermediate result. Concurrent threads may be synchronized prior to sharing data, e.g., using semaphores, barriers, or other synchronization techniques.

According to another aspect of the present invention, a processor includes a processing core and core interface logic coupled to the processing core. The processing core includes multiple processing engines configured to execute multiple threads concurrently and a shared memory (e.g., a global register file or other on-chip or off-chip memory) communicably coupled to the processing engines. The core interface logic includes a launch module. The launch module is configured to initiate concurrent execution by the processing core of threads making up a thread array, each thread of the thread array being configured to execute a same program on an input data set. The launch module is also configured to assign a unique thread identifier (which can be, e.g., a one-dimensional or multidimensional identifier) to each of the threads prior to instructing the processing core to initiate execution of the thread. In operation, each thread of the thread array uses the unique thread identifier to determine at least one processing behavior, such as a subset of an input data set to process and/or a portion of an output data set to produce or write.

In one embodiment, the processing core includes a local register file having a number of entries allocated to each of the plurality of threads, and the thread identifier for each thread is stored in one of the local register file entries allocated to that thread.

In some embodiments, the processing core also includes an instruction unit configured to supply a same instruction to all of the processing engines in SIMD parallelism such that different ones of the processing engines execute the same instruction for a different one of the threads in the thread array. In one such embodiment, the processing engines are each configured to support multiple concurrent threads, and the core interface logic is configured to divide the array of threads into SIMD groups such that one thread in each SIMD group is executed by each of the processing engines. The launch module may be further configured to assign the thread identifiers for each thread in one of the SIMD groups, then launch that SIMD group.

In some embodiments, the core interface logic also includes a state module configured to receive and store state information defining the thread array, the state information including array size information for the thread array, and the launch module is further configured to determine the unique thread identifier for each thread of the thread array based on the array size information stored in the state module.

According to another aspect of the present invention, a method for processing an input data set using a processor (which might be, e.g., a graphics processor) configured to execute a plurality of threads concurrently includes communicating to the processor information defining a thread array having a plurality of threads, each thread being identified by a unique thread identifier (which can be, e.g., a one-dimensional or multidimensional identifier). Also communicated to the processor is a program to be executed by each thread of the thread array on at least a portion of an input data set stored in a shared memory to produce at least a portion of an output data set; during program execution, the unique thread identifier is used by each thread to determine at least one processing behavior. The input data set is communicated to the processor, and the processor stores the input data set in a shared memory communicably coupled to the processing engines. An instruction to begin concurrently executing all of the threads of the thread array to process the input data set in the shared memory to produce the output data set is communicated to the processor. In some embodiments, each thread processes a different portion of the input data set, and in some embodiments, each thread produces a different portion of the output data set.

In one embodiment, the shared memory is internal to the processor, and the method also includes communicating to the processor an instruction to transfer result data generated by executing all of the threads of the thread array to a memory location external to the processor.

The following detailed description together with the accompanying drawings will provide a better understanding of the nature and advantages of the present invention.

BRIEF DESCRIPTION OF THE DRAWINGS

FIG. 2A is a conceptual model of a multidimensional cooperative thread array according to an embodiment of the present invention;

FIG. 2B illustrates a bit field used to store a multidimensional thread identifier for a thread of a cooperative thread array according to an embodiment of the present invention;

FIG. 2C illustrates an assignment of thread identifiers to threads for processing a two-dimensional tile according to an embodiment of the present invention;

FIG. 2D illustrates a tiling of a high definition television image for processing by multiple cooperative thread arrays according to an embodiment of the present invention;

DETAILED DESCRIPTION OF THE INVENTION

Embodiments of the present invention provide data processing systems and methods that use cooperative thread arrays (CTAs) to perform computations. As used herein, a "cooperative thread array," or "CTA," is a group of multiple threads that concurrently execute the same program on an input data set to produce an output data set. Each thread in a CTA has a unique identifier (thread ID) assigned at thread launch time that controls various aspects of the thread's processing behavior. For instance, a thread ID may be used to determine which portion of the input data set a thread is to process, to identify one or more other threads with which a given thread is to share an intermediate result, and/or to determine which portion of the output data set the thread is to compute or write.

CTAs can be executed in a variety of processing architectures, including any sequential single processors, parallel processors, multithreaded processors, and any architecture that can support multiple concurrent threads and that provides at least some shared memory, interconnection network, or other technology that allows threads to communicate with each other. In some embodiments, CTAs are executed using a processing core of a graphics processor that has multiple parallel processing engines, each capable of supporting multiple concurrent threads. The threads are advantageously executed in SIMD (single instruction, multiple data) groups, with one thread of the group being associated with each processing engine. A single instruction unit issues an instruction to an entire SIMD group in parallel, and each processing engine executes the instruction in the context of its thread of the current SIMD group; instructions for different SIMD groups can be issued in any order. By executing each instruction in the appropriate context, each processing engine executes one thread in each of multiple concurrent SIMD groups.

Thread IDs are advantageously assigned as the threads of a CTA are launched, and the interface logic for the processing core is advantageously configured to automatically assign thread IDs to threads as the threads are being launched. Automatic assignment of thread IDs eliminates the need for an application programmer to explicitly configure each thread. Instead, the programmer can simply define the number of threads in the CTA and the operations each thread is to do; the particular manner in which the CTA is executed is advantageously made transparent to the programmer.

Computer System Overview

Figure 1:
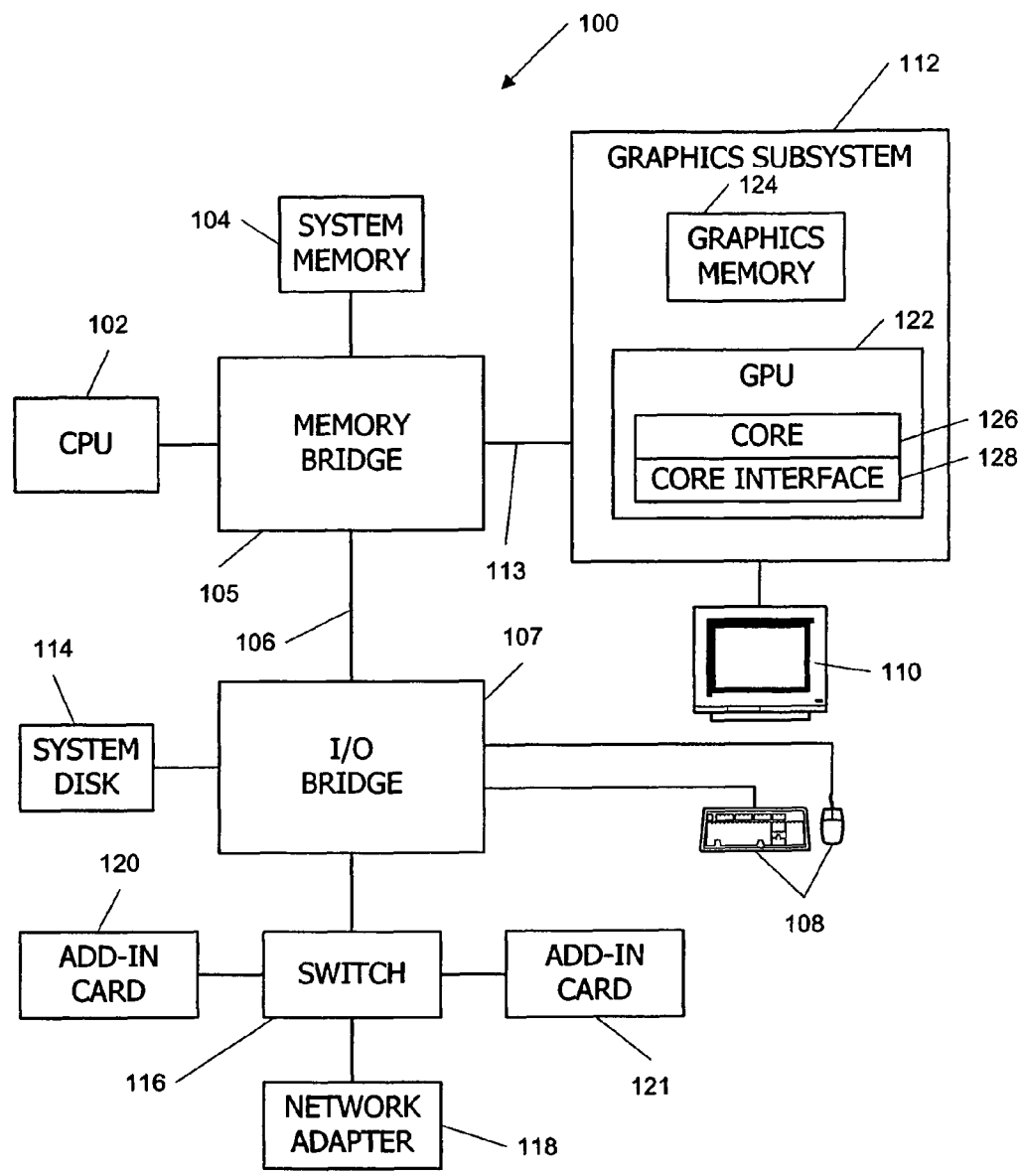
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Accelerated Graphics Port), HyperTransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102.

GPU 122 has at least one processing core 126 for generating pixel data and a core interface 128 that controls operation of core 126. Core 126 advantageously includes multiple parallel processing engines that can be used to execute various shader programs, including vertex shader programs, geometry shader programs, and/or pixel shader programs, in the course of generating images from scene data. Core 126 can also be leveraged to perform general-purpose computations as described below.

GPU 122 may also include other components, not explicitly shown, such as a memory interface that can store pixel data received via memory bridge 105 to graphics memory 124 with or without further processing, a scan out module configured to deliver pixel data from graphics memory 124 to display device 110, and so on.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, little or no dedicated graphics memory is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, computer servers, video game consoles and other special purpose computer systems, DVD players, handheld devices such as mobile phones or personal digital assistants, and so on.

Cooperative Thread Arrays (CTAs)

In accordance with an embodiment of the present invention, core 126 of GPU 122 is a multithreaded or parallel processing core that can be leveraged for general-purpose computations by executing cooperative thread arrays (CTAs). As used herein, a "CTA" is a group of multiple threads that concurrently execute the same program on an input data set to produce an output data set. Each thread in the CTA is assigned a unique thread identifier ("thread ID") that is accessible to the thread during its execution. The thread ID controls various aspects of the thread's processing behavior. For instance, a thread ID may be used to determine which portion of the input data set a thread is to process, to identify one or more other threads with which a given thread is to share an intermediate result, and/or to determine which portion of an output data set a thread is to produce or write.

CTAs are advantageously employed to perform computations that lend themselves to a data parallel decomposition, i.e., application of the same processing algorithm to different portions of an input data set in order to effect a transformation of the input data set to an output data set. The processing algorithm is specified in a "CTA program," and each thread in a CTA executes the same CTA program on a different subset of an input data set. A CTA program can implement algorithms using a wide range of mathematical and logical operations, and the program can include conditional or branching execution paths and direct and/or indirect memory access.

Threads in a CTA can share intermediate results with other threads in the same CTA using a shared memory that is accessible to all of the threads, an interconnection network, or other technologies for inter-thread communication, including other technologies known in the art. In some embodiments, the CTA program includes an instruction to compute an address in shared memory to which particular data is to be written, with the address being a function of thread ID. Each thread computes the function using its own thread ID and writes to the corresponding location. The function is advantageously defined such that different threads write to different locations; as long as the function is deterministic, the location written to by any thread is well-defined. The CTA program can also include an instruction to compute an address in shared memory from which data is to be read, with the address being a function of thread ID. By defining suitable functions, data can be written to a given location by one thread and read from that location by a different thread in a predictable manner. Consequently, any desired pattern of data sharing among threads can be supported, and any thread in a CTA can share data with any other thread in the same CTA.

Since all threads in a CTA execute the same program, any thread can be assigned any thread ID, as long as each valid thread ID is assigned to only one thread. In one embodiment, thread IDs are assigned sequentially to threads as they are launched, as described below. It should be noted that as long as data sharing is controlled by reference to thread IDs, the particular assignment of threads to processing engines will not affect the result of the CTA execution. Thus, a CTA program can be independent of the particular hardware on which it is to be executed.

Any unique identifier (including but not limited to numeric identifiers) can be used as a thread ID. In one embodiment, if a CTA includes some number (T) of threads, thread IDs are simply sequential index values from 0 to T−1. One-dimensional indexing, however, can make it more difficult for the programmer to define data sharing patterns among the threads, particularly in applications where the data being processed corresponds to points in a multidimensional space.

Accordingly, in some embodiments of the present invention, thread IDs can be multidimensional indices. FIG. 2A is a conceptual model of threads in a multidimensional CTA 200 according to an embodiment of the present invention. Each small block 202 corresponds to a thread. The threads are arranged in a three-dimensional box with dimensions D0, D1, and D2; the array includes a total of T=D0*D1*D2 threads. Each block 202 has coordinates in three dimensions (i0, i1, i2), and those coordinates represent the thread ID of the corresponding thread. It is to be understood that D0, D1, and D2 can be any positive integers.

In some embodiments, a multidimensional thread ID can be stored as a single value, e.g., using a partitioned bit field. FIG. 2B illustrates a bit field 220 used to store a three-dimensional thread ID (i2, i1, i0) according to an embodiment of the present invention. Bit field 220, which might be, e.g., 32 bits, is partitioned into an i0 field 222 (e.g., 16 bits), an i1 field 224 (e.g., 10 bits) and an i2 field 226 (e.g., 6 bits). In a particular implementation, the size of the field available for each dimension determines an upper limit on that dimension. For instance, in one embodiment, D0 is limited to $2^{16}$, D1 to $2^{10}$, and D2 to $2^6$. It will be understood that the total size of a thread ID bit field, the number of dimensions, and the partitioning of the bits among multiple dimensions are all matters of design choice and may be varied as desired. In some embodiments, the product D0*D1*D2 may exceed the number of threads instantiated in the CTA.

From an application programmer's perspective, multidimensional thread IDs can be used to simplify the assignment of threads to input data and/or the sharing of data among threads. For instance, in an image processing application, a CTA might be defined to apply a filter to a 16×16 tile of pixels. As shown in FIG. 2C for a tile 230, two-dimensional thread IDs can be assigned to each pixel in a manner that correlates with the location of the pixel relative to the tile boundaries. Thus, pixel 231 in the upper left corner of tile 230 has thread ID (0,0), pixel 232 in the upper right corner has thread ID (0, 15), and so on, pixel 234 in the lower right corner having thread ID (15, 15).

In some embodiments, multiple CTAs (e.g., an array or grid of CTAs) can be used to solve larger problems. A CTA program can be executed on any one of a scalable family of processors, where different members of the family have different numbers of processing engines; within such a family, the number of processing engines determines the number of CTAs that can be executed in parallel, a significant factor in determining overall performance. Arrays or grids of CTAs can be used to partition large problems, reduce solution time, or make operation possible in processors where processing one large CTA would exceed available resources.

In addition to thread IDs, some embodiments also provide a CTA identifier that is common to all threads in the CTA. A CTA identifier can be helpful to a programmer, e.g., where an input data set is to be processed using multiple CTAs that process different (possibly overlapping) portions of an input data set. The CTA identifier may be stored in a local register of each thread, in a state register accessible to all threads of the CTA, in a shared memory, or in other storage accessible to the threads of the CTA.

For instance, the 16×16 tile of pixels illustrated in FIG. 2C might be a portion of a much larger image, such as a high definition television (HDTV) image 240 shown in FIG. 2D. A different CTA can be used to process each tile 241, 242, etc. Different tiles can be identified using CTA identifiers. Like thread IDs, CTA identifiers can be multidimensional; thus, a CTA identifier can correspond to the tile coordinates within image 240 (e.g., (0,0) for tile 241, (0,1) for tile 242, and so on). In this example, a thread can be programmed to determine the screen coordinates of its pixel using the CTA identifier of its CTA (which determines the tile location) and its own thread ID (which determines the pixel's offset within the tile).

While all threads within a CTA are executed concurrently, there is no requirement that different CTAs are executed concurrently, and the hardware need not support sharing of data between threads in different CTAs. Thus, CTAs can be executed using any processing hardware with one or more processing engines.

It will be appreciated that the size of a CTA and number of CTAs required for a particular application will depend on the application. Thus, the size of a CTA, including dimensions D0, D1 and D2, as well as the number of CTAs to be executed, are advantageously defined by the programmer and provided to core 126 and core interface 128 as state parameters, as described below.

A Core Architecture

CTAs can be executed using various hardware architectures, provided that the architecture can support concurrent execution of all threads of the CTA, the ability to share data among concurrent threads, and the ability to assign a unique thread ID to each thread of the CTA. In some embodiments, a suitable architecture is provided within a graphics processor such as GPU 122 of FIG. 1.

In one embodiment, GPU 122 implements a rendering pipeline that includes vertex and geometry processing, primitive setup and rasterization, attribute assembly, and pixel processing. The rendering pipeline supports various shader programs including vertex shaders, geometry shaders, and pixel shaders, examples of which are known in the art. Shader programs of arbitrary complexity are advantageously supported using a "unified shader" architecture in which one or more processing cores 126 support concurrent execution of a (preferably large) number of instances of vertex, geometry, and/or pixel shader programs in various combinations. In accordance with an embodiment of the present invention, processing core 126 is leveraged to execute CTAs for general-purpose computations.

Figure 3:
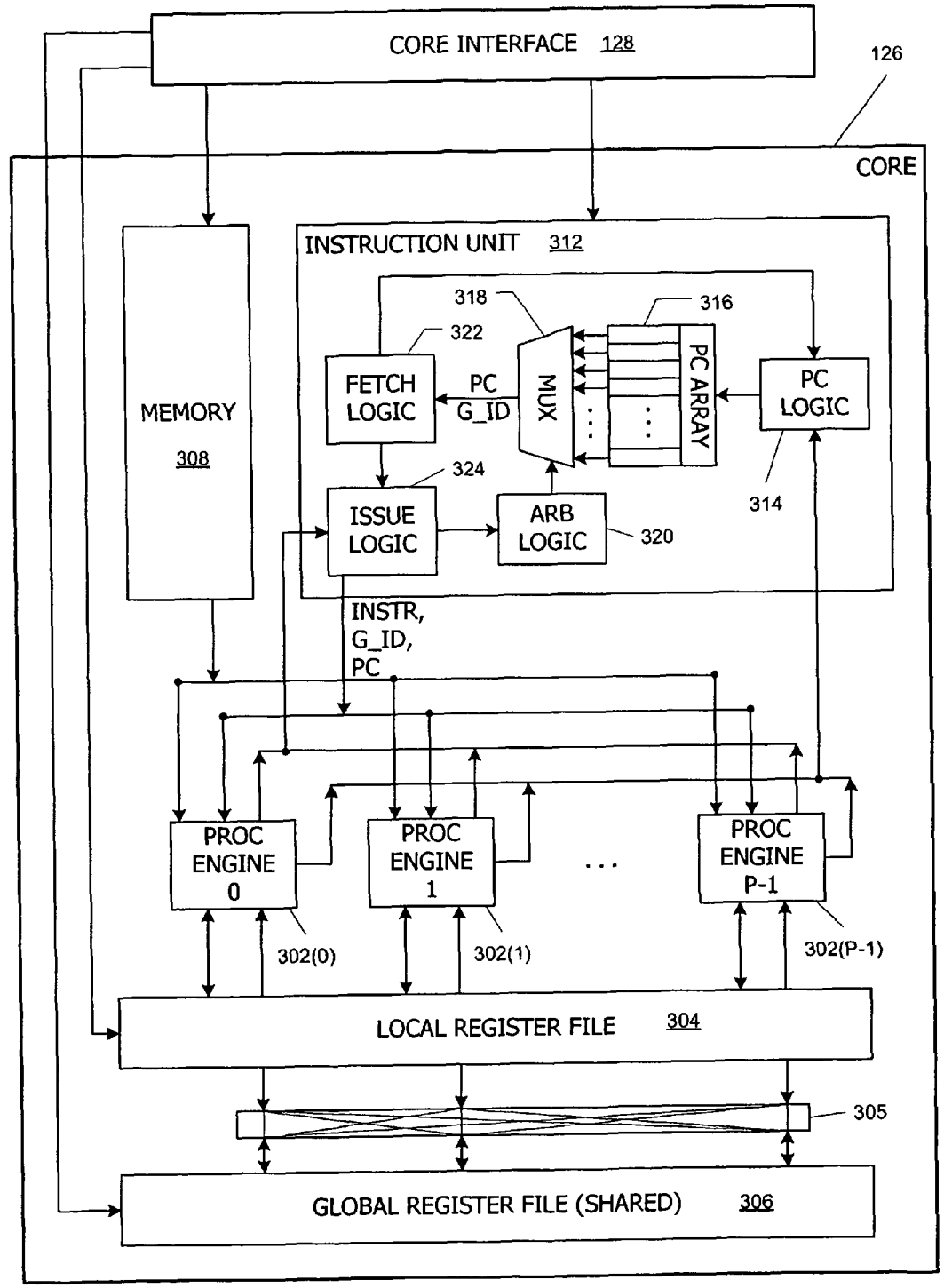
FIG. 3 is a block diagram of a processing core according to an embodiment of the present invention.

FIG. 3 is a block diagram of a processing core 126 according to an embodiment of the present invention. Core 126 is advantageously configured to execute a large number of threads in parallel. During a rendering operation, a thread might be an instance of a vertex shader program executing on the attributes of a single vertex or an instance of a pixel shader program executing on a given primitive and pixel. During general-purpose computing, a thread can be an instance of a CTA program executing on a portion of an input data set. In core 126, single-instruction, multiple-data (SIMD) instruction issue techniques are used to support parallel execution of a large number of threads by multiple processing engines without requiring multiple instruction units.

In one embodiment, core 126 includes an array of P (e.g., 8, 16, or any other number) parallel processing engines 302 configured to receive and execute SIMD instructions from a single instruction unit 312. Each parallel processing engine 302 advantageously includes an identical set of functional units such as arithmetic logic units, load/store units, and the like (not explicitly shown). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations. A particular implementation of processing engines 302 is not critical to the present invention, and a detailed description has been omitted.

Each processing engine 302 is allocated space in a local register file 304 for storing its local input data, intermediate results, and the like. In one embodiment, local register file 304 is divided into P lanes, each having some number of entries (where each entry might be, e.g., a 32-bit word). One lane is allocated to each processing unit, and corresponding entries in different lanes can be populated with data for corresponding thread types to facilitate SIMD execution of multiple threads in parallel as described below. The number of entries in local register file 304 is advantageously large enough to support multiple concurrent threads per processing engine 302; and in some embodiments, the number of entries allocated to a thread is dynamically configurable.

Each processing engine 302 also has access, via a crossbar switch 305, to a (shared) global register file 306 that is shared among all of the processing engines 302 in core 126. Global register file 306 may be as large as desired, and in some embodiments, any processing engine 302 can read to or write from any location in global register file 306. In addition to global register file 306, some embodiments also provide an on-chip shared memory 308, which may be implemented, e.g., as a conventional RAM. On-chip memory 308 is advantageously used to store data that is expected to be used in multiple threads, such as coefficients of attribute equations, which are usable in pixel shader programs. In some embodiments, processing engines 302 may also have access to additional off-chip shared memory (not shown), which might be located, e.g., within graphics memory 124 and/or system memory 104 of FIG. 1.

In one embodiment, each processing engine 302 is multithreaded and can execute up to some number G (e.g., 24) of threads concurrently. Processing engines 302 are advantageously designed to switch rapidly from any one active thread to any other active thread. For instance, processing engine 302 can maintain current state information associated with each thread in a different portion of its allocated lane in local register file 306, facilitating fast switching.

Instruction unit 312 is configured such that, for any given processing cycle, the same instruction (INSTR) is issued to all P processing engines 302. Thus, at the level of a single clock cycle, core 126 implements P-way SIMD execution. Each processing engine 302 is also multithreaded, supporting up to G concurrent threads, and instructions for different ones of the G threads can be issued in any order relative to each other. Accordingly, core 126 in this embodiment can have up to P*G threads in flight concurrently. For instance, if P=16 and G=24, then core 126 can support up to 384 concurrent threads. In some embodiments, P*G determines an upper limit on the number of threads that can be included in a CTA; it is to be understood that some CTAs may include fewer than this number of threads.

Because instruction unit 312 issues the same instruction to all P processing engines 302 in parallel, core 126 is advantageously used to process threads in "SIMD groups." As used herein, a "SIMD group" refers to a group of up to P threads of execution of the same program on different input data, with one thread of the group being assigned to each processing engine 302. For example, a SIMD group might consist of any P threads of a CTA, each of which executes the same CTA program. A SIMD group can include fewer than P threads, in which case some of processing engines 302 will simply be idle during cycles when that SIMD group is being processed. Since a processing engine 302 can support up to G threads, it follows that up to G SIMD groups can be in flight in core 126 at any given time.

On each clock cycle, one instruction is issued to all P threads making up a selected one of the G SIMD groups. To indicate which thread is currently active, a "group index" (GID) for the associated thread may be included with the instruction. Processing engine 302 uses group index GID as a context identifier, e.g., to determine which portion of its allocated lane in local register file 304 should be used when executing the instruction. Thus, in a given cycle, all processing engines 302 in core 126 are nominally executing the same instruction for different threads in the same group. It should be noted that no particular correlation between thread ID and group index GID is required, and group index GID is advantageously not used in defining CTA behavior.

Although all threads within a group are executing the same program, the execution paths of different threads in the group might diverge from each other. For instance, a conditional branch in the program might be taken by some threads and not taken by others. Each processing engine 302 can maintain a local program counter (PC) value for each thread it is executing; if the PC value associated with an instruction received for a thread does not match the local PC value for that thread, processing engine 302 simply ignores the instruction (e.g., executing a no-op).

Further, as noted above, a SIMD group might contain fewer than P threads; an "active" mask generated by core interface 128 can be used to indicate which processing engines 302 are executing threads and which are idle. A processing engine 302 that is idle may execute no-ops, or it may execute operations with the results being discarded rather than being written to registers.

Instruction unit 312 advantageously manages instruction fetch and issue for each SIMD group so as to ensure that threads in a group that have diverged eventually resynchronize. In one embodiment, instruction unit 312 includes program counter (PC) logic 314, a program counter register array 316, a multiplexer 318, arbitration logic 320, fetch logic 322, and issue logic 324. Program counter register array 316 stores G program counter values (one per SIMD group), which are updated independently of each other by PC logic 314. PC logic 314 updates the PC values based on information received from processing engines 302 and/or fetch logic 322. PC logic 314 is advantageously configured to track divergence among threads in a SIMD group and to select instructions in a way that ultimately results in the threads re-synchronizing.

Fetch logic 322, which may be of generally conventional design, is configured to fetch an instruction corresponding to a program counter value PC from an instruction store (not shown) and to provide the fetched instructions to issue logic 324. In some embodiments, fetch logic 322 (or issue logic 324) may also include decoding logic that converts the instructions into a format recognizable by processing engines 302.

Arbitration logic 320 and multiplexer 318 determine the order in which instructions are fetched. More specifically, on each clock cycle, arbitration logic 320 selects one of the G possible group indices GID as the SIMD group for which a next instruction should be fetched and supplies a corresponding control signal to multiplexer 318, which selects the corresponding PC. Arbitration logic 320 may include conventional logic for prioritizing and selecting among concurrent threads (e.g., using round-robin, least-recently serviced, or the like), and selection may be based in part on feedback information from fetch logic 322 or issue logic 324 as to how many instructions have been fetched but not yet issued for each SIMD group.

Fetch logic 322 provides the fetched instructions, together with the group index GID and program counter value PC, to issue logic 324. In some embodiments, issue logic 324 maintains a queue of fetched instructions for each in-flight SIMD group. Issue logic 324, which may be of generally conventional design, receives status information from processing engines 302 indicating which SIMD groups are ready to execute a next instruction. Based on this information, issue logic 324 selects a next instruction to issue and issues the selected instruction, together with the associated PC value and GID. Each processing engine 302 either executes or ignores the instruction, depending on whether the PC value corresponds to the next instruction in its thread associated with group index GID and depending on the active mask for the selected SIMD group.

In one embodiment, instructions within a SIMD group are issued in order relative to each other, but the next instruction to be issued can be associated with any one of the SIMD groups. For instance, if in the context of one SIMD group, one or more processing engines 302 are waiting for a response from other system components (e.g., off-chip memory), issue logic 324 advantageously selects a group index GID corresponding to a different SIMD group.

For optimal performance, all threads within a SIMD group are advantageously launched on the same clock cycle so that they begin in a synchronized state. In one embodiment, core interface 128 advantageously loads SIMD groups into core 126, then instructs core 126 to launch the group. "Loading" a thread, as used herein, includes supplying instruction unit 312 and processing engines 302 with various input parameters required to execute the program. In some instances, the input parameters may include the input data to be processed by the program; in other instances, the input data is stored in global register file 306 or other shared memory (e.g., graphics memory 124 or system memory 104 of FIG. 1) prior to loading of any threads, and the input parameters may include a reference to a location where the input data is stored. For example, in the case of CTA processing, the input data set may be loaded into graphics memory 124 or system memory 104 before core interface is instructed to begin CTA processing. Core interface 128 loads the starting PC value for the CTA program into a slot in PC array 316 that is not currently in use; this slot corresponds to the group index GID assigned to the new SIMD group that will process P of the CTA threads. Core interface 128 allocates sufficient space in the local register file for each processing engine 302 to execute one CTA thread, then loads input parameters into shared memory (e.g., global register file 306). Core interface 128 loads a unique thread ID into a thread ID register for each thread or into a predetermined register in the allocated portion of local register file 304 for each processing engine 302. In one embodiment, thread IDs for P threads are loaded in parallel, as described below. Once the input parameters and thread IDs for all threads in the SIMD group have been loaded, core interface 128 launches the group by signaling instruction unit 312 to begin fetching and issuing instructions corresponding to the group index GID of the new group.

It will be appreciated that the processing core described herein is illustrative and that variations and modifications are possible. Any number of processing units may be included. In some embodiments, each processing unit has its own local register file, and the allocation of local register file entries per thread can be fixed or configurable as desired.

In some embodiments, core 126 is operated at a higher clock rate than core interface 128, allowing the core to process more data in a given amount of time. For instance, core 126 can be operated at a clock rate that is twice the clock rate of core interface 128. If core 126 includes P processing engines 302 producing data at twice the core interface clock rate, then core 126 can produce 2*P data values per core interface clock cycle. Provided there is sufficient space in local register file 304, from the perspective of core interface 128, the situation is effectively identical to a core with 2*P processing units. Thus, P-way SIMD parallelism could be produced either by including P processing units in core 126 and operating core 126 at the same clock rate as core interface 128 or by including P/2 processing units in core 126 and operating core 126 at twice the clock rate of core interface 128. Other timing variations are also possible.

In another alternative embodiment, SIMD groups containing more than P threads ("supergroups") can be defined. A supergroup is defined by associating the group index values of two (or more) of the SIMD groups (e.g., GID1 and GID2) with each other. When issue logic 324 selects a supergroup, it issues the same instruction twice on two successive clock cycles: on one cycle, the instruction is issued for GID1, and on the next cycle, the same instruction is issued for GID2. Thus, the supergroup is in effect a SIMD group. Supergroups can be used to reduce the number of distinct program counters, state definitions, and other per-group parameters that need to be maintained without reducing the number of concurrent threads. In some embodiments, supergroups can be extended to the entire size of a CTA.

Core Interface

Figure 4:
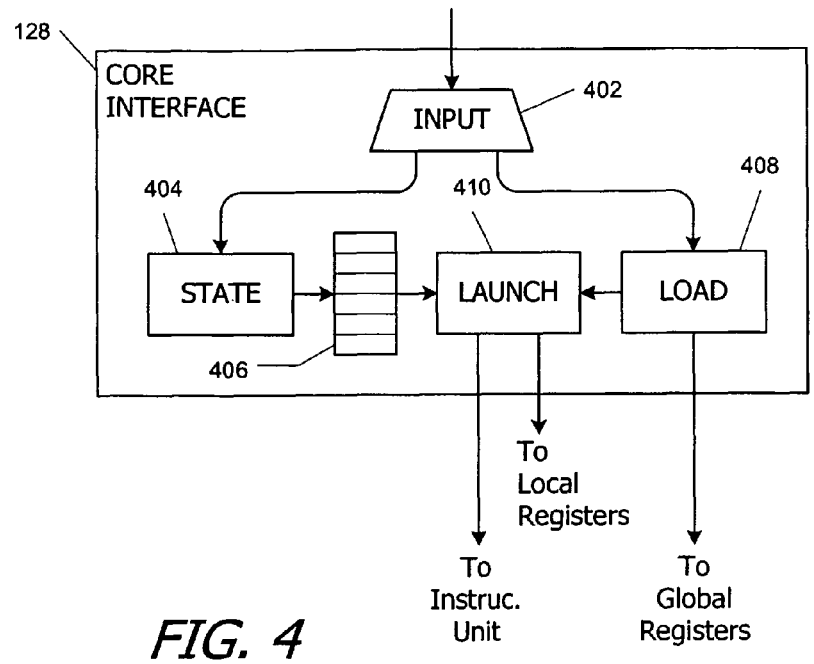
FIG. 4 is a block diagram of a core interface for a processing core according to an embodiment of the present invention.

FIG. 4 is a block diagram of core interface 128 according to an embodiment of the present invention. Core interface 128 includes an input unit 402, a state module 404, state registers 406, a load module 408, and a launch module 410. As described above, core interface 128 (FIG. 1) controls operation of core 126. In particular, core interface 128 loads and launches threads of a CTA in SIMD groups until all threads have been launched. In one embodiment, core interface 128 generates thread IDs for each thread in a SIMD group and writes the thread ID into a suitable location in local register file 304, then launches the SIMD group. These aspects of core interface 128 will now be described.

Input unit 402 receives all incoming signals, including state information, data and commands, and directs the signals to state module 404 or load module 406. In one embodiment, input unit 402 receives a data word (e.g., 32 bits) along with control signals indicating whether the data word corresponds to state information or data to be processed. Based on the control signals, input unit 402 determines where to direct the data word, and all or part of the control signal may be forwarded together with the data word. For instance, if the data word corresponds to state information, the control signals may be used by state module 404 to determine where to store the data word, as described below.

State module 404 receives state information from input unit 402 and loads the state information into state registers 406. "State information," as used herein, includes any information (other than input data) relevant to defining a CTA. For example, in one embodiment, state information includes the size of the input data set, the amount of local register file space required for each thread, and a starting program counter (e.g., memory address) for a program to be executed by each thread. State information advantageously also includes size information for the CTA; for example, referring to FIG. 2A, array dimensions D0, D1 and D2 may be provided. In some embodiments, the total number (T) of threads is also provided; in other embodiments, T can be computed from the array dimensions (e.g., T=D0*D1*D2 for the embodiment of FIG. 2A). When T is provided, T is advantageously less than or equal to D0*D1*D2, in order to ensure that each thread is assigned a unique thread ID.

Figure 5:
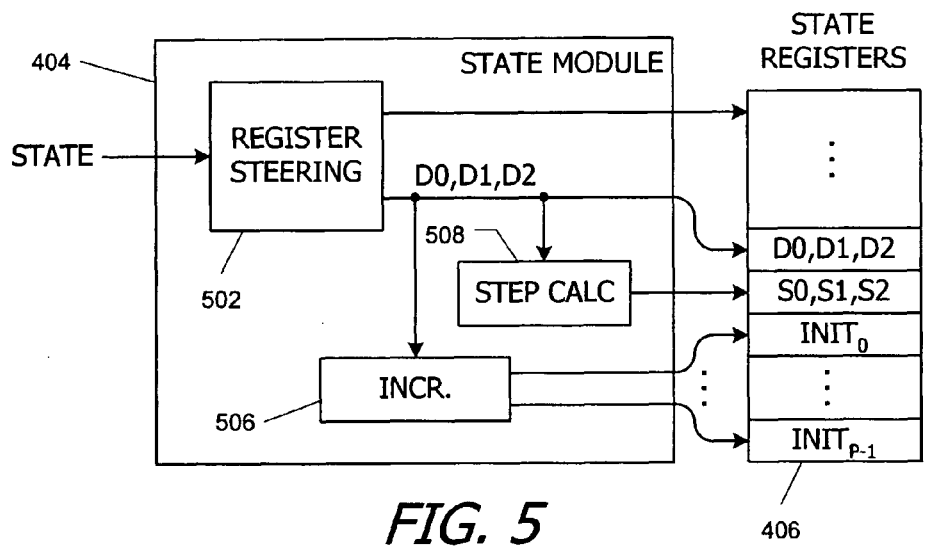
FIG. 5 is a block diagram of a state module of a core interface according to an embodiment of the present invention.

FIG. 5 is a block diagram of state module 404 according to an embodiment of the present invention. In this embodiment, state information defining a CTA is delivered in advance of any data to be processed using that CTA. Each item of state information is advantageously stored in one of state registers 406 until such time as that item is updated, facilitating execution of multiple CTAs having the same state. State module 404 can also compute additional state parameters based on the received state information. In particular, state module 404 computes an initial set of P thread IDs for the CTA and a "step size" between one of the first P thread IDs and a corresponding thread ID in the next group of P threads. This information can be used to expedite loading and launching of CTA threads, as described below.

More specifically, state module 404 includes a register steering circuit 502 that receives each item of state information and directs it to an appropriate one of state registers 406. Steering circuit 502 may be of conventional design, and a detailed description is omitted as not being critical to understanding the present invention.

When the state information corresponds to the CTA dimensions (D0, D1, D2), register steering circuit 502 steers the information onto a data path 504 that couples the information into an increment (INCR) unit 506 and a step calculation unit 508. Increment unit 506 generates the first P sequential thread IDs for an array of the given dimensions and stores these thread IDs as a set of P initial values ($INIT_0$ to $INIT_{P-1}$) in P state registers 406. Step calculation unit 508 computes a step size in three dimensions between one of the P initial values and a corresponding value in the next set of P thread IDs. In one embodiment, the computed step size (S2, S1, S0) is stored in one of the state registers 406. As described below, the initial values and step size can be used to facilitate efficient launch of the SIMD groups.

Figure 6:
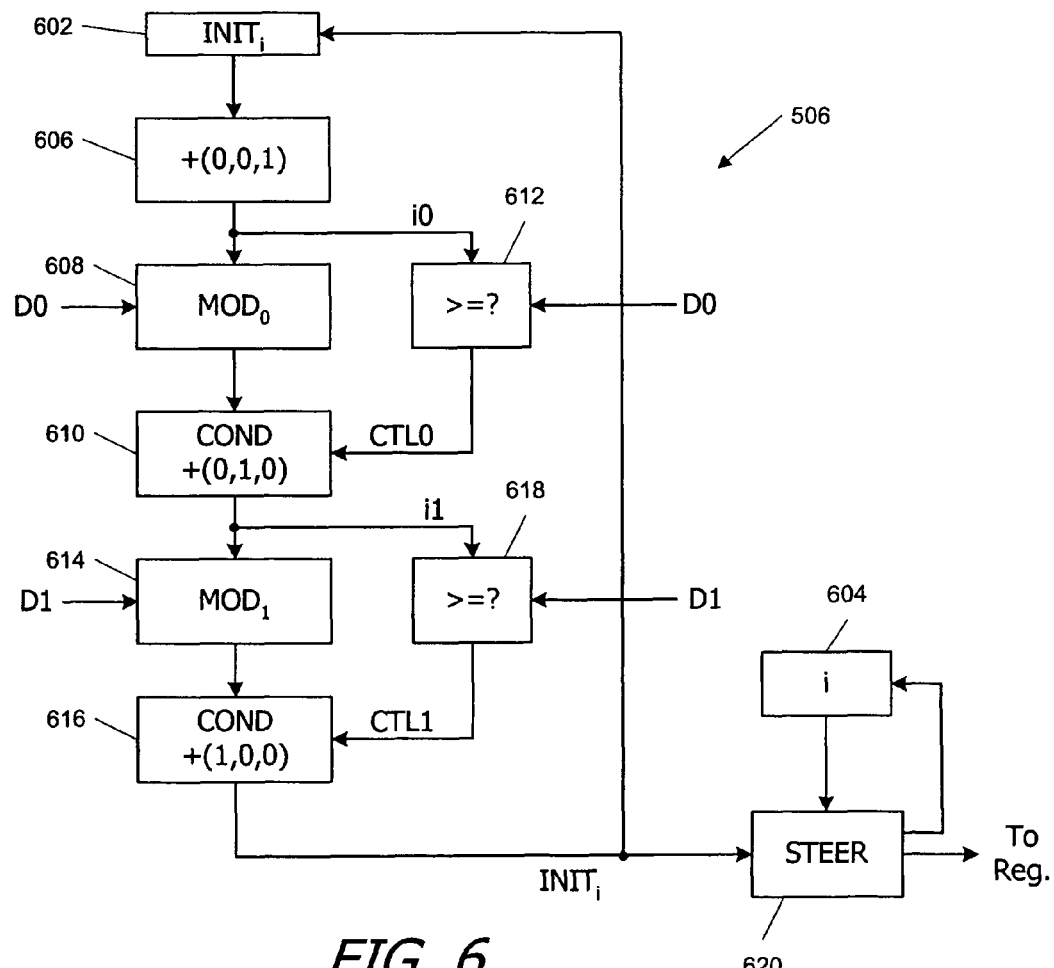
FIG. 6 is a block diagram of an increment unit in a state module of a core interface according to an embodiment of the present invention.

FIG. 6 is a block diagram of increment unit 506 according to an embodiment of the present invention. In this embodiment, increment unit 506 sequentially generates the first P thread IDs (i2, i1, i0) starting from a first thread ID ($INIT_0$) that is initialized to (0, 0, 0). This value is loaded into a register 602, and an index counter (i) 604 is initialized to zero. $INIT_0$ is also loaded into the first of the P state registers 406 (shown in FIG. 5) that are allocated for storing initial thread IDs.

An add block 606 adds a fixed increment (0, 0, 1) to the initial value $INIT_i$ in register 602, incrementing the i0 component of the thread ID. As long as i0 is less than D0 (the array size in the i0 dimension), the result of the addition is the next sequential thread ID. The i1 component of the thread ID is incremented each time i0 reaches D0. Similarly, the i2 component of the thread ID is incremented each time i1 reaches D1.

More specifically, a modulo ($MOD_0$) unit 608 computes i0 mod D0 and passes the result to a conditional add block 610 that adds +(0, 1, 0) if a control signal CTL0 is asserted and otherwise passes the thread ID through unmodified. Whether to assert control signal CTL0 is determined by a comparison circuit 612: CTL0 is asserted if i0 is equal to (or greater than) D0 and deasserted otherwise.

After conditional add block 610, a second modulo (MOD1) unit 614 computes i1 mod D1 and passes the result to a second conditional add block 616 that adds +(1, 0, 0) to the thread ID if a control signal CTL1 is asserted and otherwise passes the thread ID through unmodified. Whether to assert control signal CTL1 is determined by a comparison circuit 618: CTL1 is asserted if i1 is equal to (or greater than) D1 and deasserted otherwise.

After conditional add block 616, the resulting thread ID $INIT_i$ is steered by a steering circuit 620 into one of the state registers 406 (FIG. 5). Steering circuit 620 advantageously uses the index counter value i to determine where to steer the thread ID. Once the thread ID has been steered, counter 604 is incremented, and the process repeats for the next thread ID. After the Pth thread ID has been steered into state registers 406, increment unit 506 stops generating additional thread IDs. In one embodiment, the output of counter 604 is used to determine when P thread IDs have been generated and steered; conventional control circuits (not explicitly shown) may be used to terminate operations of increment unit 506.

Figure 7:
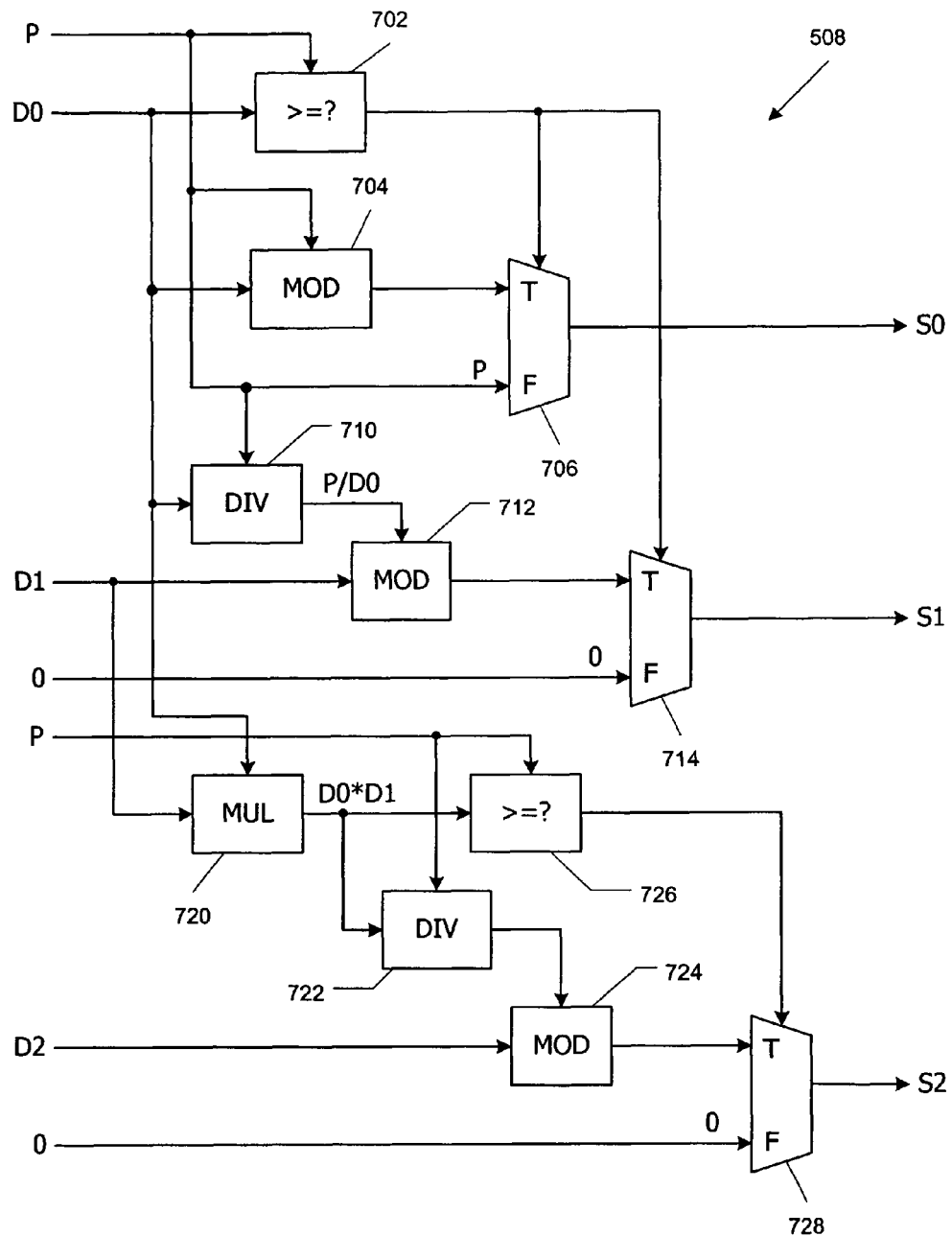
FIG. 7 is a block diagram of a step calculation unit in a state module of a core interface according to an embodiment of the present invention.

FIG. 7 is a block diagram of step calculation unit 508 according to an embodiment of the present invention. Step calculation unit 508 converts P (the number of threads in a SIMD group) to a corresponding value in the index space defined by the thread array dimensions (D2, D1, D0), resulting in a triplet of step-size values (S2, S1, S0). Using the initial set of thread IDs and the step size triplet, subsequent sets of thread IDs can rapidly be computed at thread launch time, as described below. In some embodiments, step calculation unit 508 also computes the total number T of threads in the array (e.g., T=D2*D1*D0) and stores the total in a state register 406; in other embodiments, T is received by state module 404 of FIG. 4 and stored directly in state registers 406.

Step calculation unit 508 includes a comparison unit 702 that determines whether P is greater than or equal to D0 and a modulo unit 704 that computes P mod D0. Selection unit 706 is configured such that if P is greater than or equal to D0, S0 is set to P mod D0; if P is less than D0, then S0 is set to P.

For determining S1, step calculation unit 508 includes a division unit 710 that computes P/D0. Division unit 710 advantageously performs integer division, and any remainder is ignored. A modulo unit 712 computes (P/D0) mod D1. Selection unit 714 is configured such that if P is greater than or equal to D0, S1 is set to (P/D0) mod D1; if P is less than D0, then S1 is set to 0.

For determining S2, step calculation unit 508 includes a multiplier unit 720 that multiplies D0*D1 and a division unit 722 that computes P/(D0*D1). Division unit 722 advantageously performs integer division, and any remainder is ignored. A modulo unit 724 computes P/(D0*D1) mod D2, and a comparison unit 726 determines whether P is greater than or equal to D0*D1. Selection unit 728 is configured such that if P is greater than or equal to D0*D1, S2 is set to P/(D0*D1) mod D2; if P is less than D0*D1, S2 is set to 0.

It will be appreciated that the step calculation unit shown herein is illustrative and that variations and modifications are possible. In some embodiments, a separate step calculation unit may be omitted; the step-size values S0, S1, and S2 can be determined, e.g., from an additional iteration through increment unit 506 of FIG. 6, which would produce the thread ID for the (P+1)th thread. Where the first thread always has thread ID (0, 0, 0), the thread ID for the (P+1)th thread is the step size (S2, S1, S0) Alternatively, the thread ID adder described below with reference to FIG. 9 may also be used to determine the step size.

In some embodiments, state information is provided to core interface 128 only when state changes, and multiple CTAs can be loaded and launched between state changes. Further, since state information can be stored indefinitely in state registers 406, state information can be updated incrementally; that is, only changes in state parameters need to be provided to core interface 128. The initial set of thread IDs and the step size parameters are advantageously computed only when new array dimensions are received, since they depend only on the array dimensions. In some embodiments, the number (e.g., P) of threads whose thread IDs are to be computed in parallel might also be a state parameter, in which case the initial thread IDs and step sizes might also be recomputed if that number changes.

Referring again to FIG. 4, load module 408 receives input parameters for a CTA and loads the input parameters into (shared) global register file 306 (FIG. 3) of core 126. These parameters may include, e.g., an (x,y) position of the CTA within a grid of CTAs or other CTA identifier and/or other information specific to the CTA. In some embodiments, the input parameters may also include some or all of an input data set to be processed by the CTA.

In one embodiment, the first received input parameter is accompanied by a "begin CTA" control signal indicating that what follows are input parameters for a CTA that is to be executed using the currently defined state. The control signal may also indicate the size of the input parameter set, where in global register file 306 the parameters are to be stored, and other information, e.g., a control signal identifying the last of the input parameters so that core interface 128 immediately recognizes when the CTA is ready to be launched. Alternatively, state information defining the size of the input parameter set may be stored in state registers 406, and load module 408 may use this information to determine when loading of input parameters is complete. For instance, if state registers 406 store information about the number of input parameters, load module 408 might count received input parameters until the expected number had been received.

Once all the input parameters have been loaded into global register file 306, load module 408 issues a "GO" control signal to launch module 410. Launch module 410 is configured to respond to the GO control signal by launching all of the threads for one CTA based on the current definition of CTA size stored in state registers 406. Launch module 410 supplies each thread with a unique thread ID, which is written to one of the local registers 304 (FIG. 3) allocated to that thread or to a per-thread register dedicated to storing a thread ID. Once all the threads in a SIMD group have been supplied with thread IDs, launch module 410 advantageously launches that SIMD group before beginning to supply thread IDs for the next SIMD group. Launch module 410 is advantageously designed to generate and assign thread IDs rapidly so as to minimize the delay between launching successive SIMD groups. In one embodiment, the delay can be as little as one clock cycle between successive launches.

Figure 8:
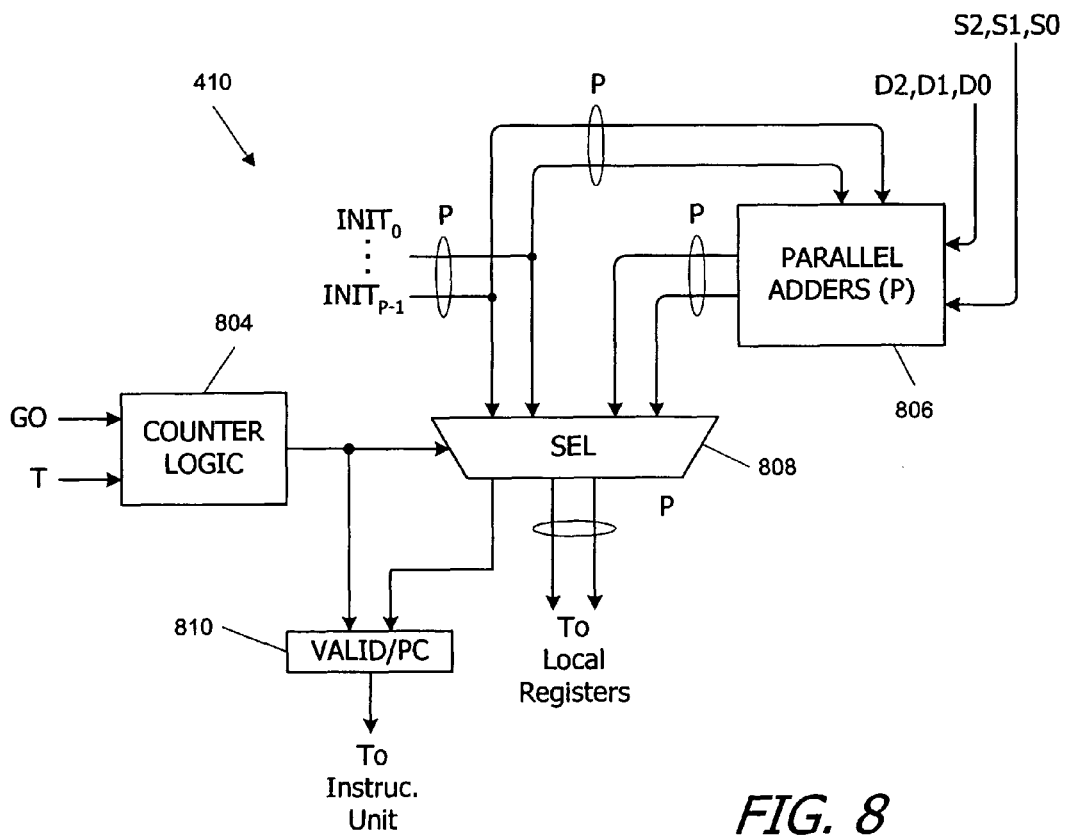
FIG. 8 is a block diagram of a launch module of a core interface according to an embodiment of the present invention.

FIG. 8 is a block diagram of launch module 410 according to an embodiment of the present invention. Launch module 410 includes counter logic 804, a set of P parallel adders 806, a P-fold selection unit 808, and a valid/PC signaling block 810. Counter logic 804 receives the GO control signal from load module 408 (FIG. 4) and the CTA size T from state registers 416. Counter logic 804 uses the CTA size T to determine how many SIMD groups the CTA requires (in some embodiments, the number of groups required is T/P, rounded up to the next integer) and maintains a count of how many of the required SIMD groups have been launched. For each SIMD group, launch module 410 generates a set of P thread IDs, loads the P thread IDs into local register file 304 (FIG. 3), then signals instruction unit 312 of core 126 to begin executing the group.

To generate thread IDs, launch module 410 reads the P initial thread IDs $INIT_0$ to $INIT_{P-1}$, the array dimensions (D2, D1, D0), and the step size (S2, S1, S0) from state registers 416 and provides these values to the P parallel adders 806. Each one of parallel adders 806 receives one of the initial thread IDs $INIT_i$ and adds the step size (S2, S1, S0) to that thread ID, subject to the rule that if the i0 component of a thread ID equals or exceeds D0, the excess must be "carried" into the i1 component and if the i1 component of a thread ID equals or exceeds D1, the excess must be "carried" into the i2 component.

To launch the first group of threads of the CTA, the P initial thread IDs are supplied to selection unit 808. In response to a control signal from counter logic 804 indicating that the first thread group is being launched, selection unit 808 selects the initial thread IDs for writing to registers in local register file 304. For all subsequent thread groups in the CTA, selection unit 808 selects the P new thread IDs computed by adders 806. (It should be noted that the thread IDs for a SIMD group need not be correlated with the group index GID assigned to the group for purposes of controlling execution.)

Figure 9:
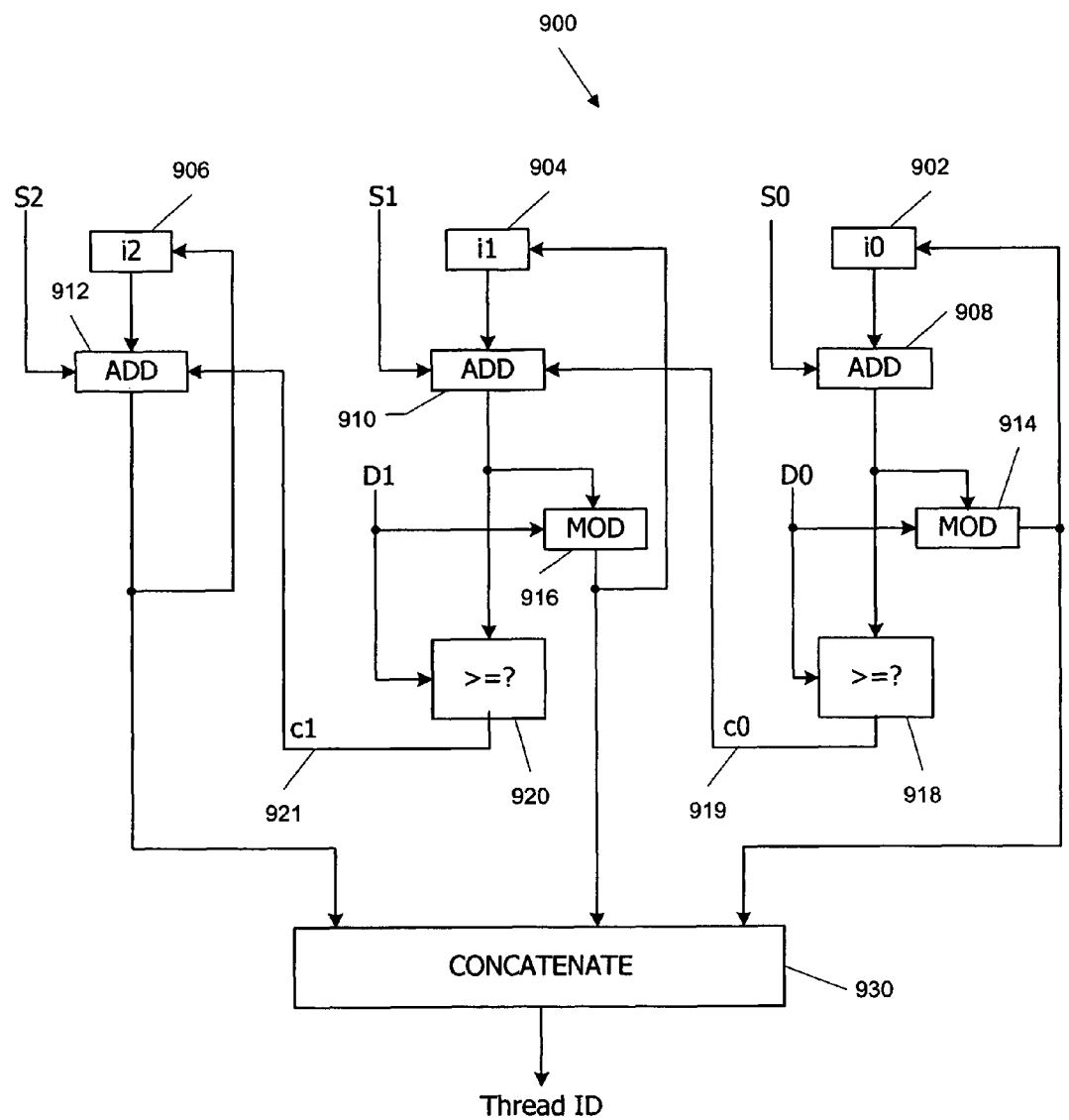
FIG. 9 is a block diagram of an adder for generating thread identifiers in a launch module of a core interface according to an embodiment of the present invention.

FIG. 9 is a block diagram of an adder 900 implementing one of the P parallel adders 806 of FIG. 8 according to an embodiment of the present invention. It is to be understood that all P parallel adders 806 may be configured identically to adder 900. Adder 900 includes three thread ID component registers 902, 904, 906 that store the i2, i1, and i0 components respectively; three adders 908, 910, 912; two modulo units 914, 916; two comparison units 918, 920 that detect carry-over from one component to the next; and a concatenation unit 930.

Initially, registers 902, 904, 906 are loaded with the thread ID components (i2, i1, i0) of one of the set of initial thread IDs obtained from state registers 406. In parallel, adders 908, 910, 912 add the step size components (S2, S1, S0) to the thread ID components (i2, i1, i0). Modulo circuit 914 determines i0 mod d0; the result is provided to concatenation unit 930 and is also fed back to register 902 for use in computing the i0 component of the next thread ID.

Comparison circuit 918 detects whether the new value of i0 is greater than or equal to D0. If so, then a carry value c0=1 is asserted on signal line 919; if not, carry value c0=0 is asserted on signal line 919. Add circuit 910 receives the carry value c0 on signal line 919 at a least significant carry input and adds the carry value c0 to S1 and i1. Modulo circuit 916 determines (S1+i1+c0) mod D1. This result is provided to concatenation unit 930 and is also fed back to register 904 for use in computing the i1 component of the next thread ID.

Comparison circuit 920 detects whether the new i1 is greater than or equal to D1. If so, then a carry value c1=1 is asserted on signal line 921; if not, carry value c1=0 is asserted on signal line 921. Add circuit 912 receives the carry value c1 on line 921 at a least significant carry input and adds the carry value c1 to S2 and i2. This result, S2+i2+c2, is provided to concatenation unit 930 and is also fed back to register 906 for use in computing the i2 component of the next thread ID.

Concatenation unit 930 aligns the i0, i1 and i2 components in the appropriate fields of the thread ID word (e.g., as shown in FIG. 2B described above) and produces a thread ID, which is delivered to selection unit 808 (FIG. 8).

Adder 900 is advantageously designed to generate new thread IDs rapidly (e.g., in as little as a single clock cycle). For instance, if D0, D1 and D2 are required to be powers of 2, modulo arithmetic can be implemented by dropping one or more most significant bits in the event that a adder result exceeds the maximum allowed width. By operating P adders 900 in parallel, with each adder initialized using a different one of the P initial thread IDs, all of the thread IDs for a SIMD group can be generated in as little as one clock cycle, and the group can be launched in the next clock cycle.

It will be appreciated that the core interface described herein is illustrative and that variations and modifications are possible. Components such as incrementers, step size calculators, and thread ID generators shown herein may be modified as desired. In some embodiments, computations described as being performed by the core interface can be performed elsewhere. For instance, a component of GPU 122 (FIG. 1) that supplies signals to the core interface might compute the initial thread IDs and/or the step size parameters and supply these values to the core interface as additional state parameters. In another alternative embodiment, a driver program executing on CPU 102 receives a CTA size parameter (e.g., dimensions D2, D1, and D0) from an application program and uses CPU resources to compute the initial P thread IDs and/or the step size, then supplies these parameters to core interface 128 of GPU 122 as state information, and incrementer 506 and step calculator 508 may both be omitted.

Further, while launching the SIMD groups for a CTA in rapid succession can improve overall performance (e.g., by reducing the time one thread has to wait for a thread in another SIMD group to generate an intermediate result), it is not required, and other launch mechanisms may be substituted provided that, at the time a given thread is launched, the thread's ID is stored in a location accessible to that thread.

It should also be noted that there is no requirement that any of the array dimensions or the total array size be a multiple of P. As described above, P thread IDs can be generated for each SIMD group regardless of any dimensional boundaries. If the total array size D is not a multiple of P, then the last SIMD group is launched with fewer than P active threads. (As described above, an active mask can be used to indicate that some of the threads in the last SIMD group are idle.)

Figure 10:
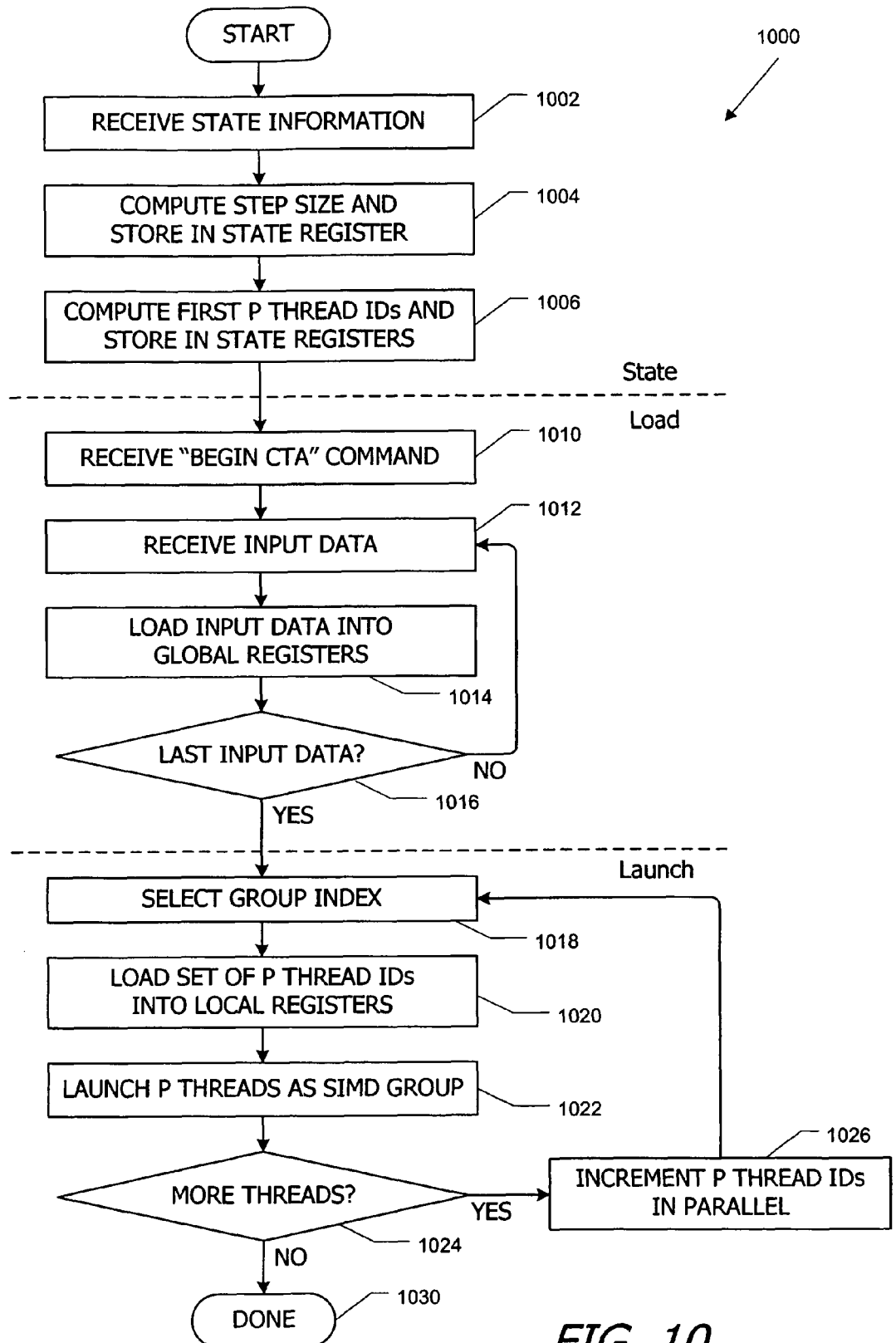
FIG. 10 is a flow diagram of a control process performed by a core interface according to an embodiment of the present invention.

Another view of the operation of core interface 128 can be had by reference to FIG. 10, a flow diagram of a control process 1000 performed by core interface 128 according to an embodiment of the present invention. Process 1000 is divided into three phases, a "state" phase, a "load" phase, and a "launch" phase.

During the state phase, at step 1002, core interface 128 receives state information defining a CTA. As described above, this information is advantageously loaded into state registers in core interface 128 and stored there until superseding state information is received. Where the state information includes initial or updated array dimensions, core interface 128 computes a new step size (e.g., using step calculator circuit 508 of FIG. 7) and stores the new step size in a state register (step 1004); likewise, core interface 128 also computes the first P thread IDs (e.g., using incrementer circuit 506 of FIG. 6) and stores these IDs in state registers (step 1006). In an alternative embodiment, incrementer circuit 506 also computes the (P+1)th thread ID, which corresponds to the step size, and step calculator circuit 508 may be omitted.

Core interface 128 remains in the state phase and continues to update the state registers as new state information is received, until such time as core interface 128 receives a "begin CTA" command (step 1010) indicating that input data is to follow. At that point, core interface 128 enters the load phase. During the load phase, core interface 128 receives input data (step 1012) and loads the input data into (shared) global register file 306 of core 126 (step 1014). At step 1016, core interface 128 determines whether the last input data has been received. If not, core interface 128 returns to step 1012 to receive more input data.

Once all of the input data has been received, core interface 128 enters the launch phase. In the launch phase, core interface 128 selects a group index GID for a first SIMD group to be launched (step 1018); any group index GID that is not already in use in core 126 may be selected. At step 1020, core interface 128 loads the initial set of P thread IDs into the local register file 304 of core 126 in locations corresponding to the selected group index GID or into per-thread registers in core 126 dedicated to storing thread IDs. Core interface 126 then instructs core 126 to launch the P threads as a SIMD group (step 1022).

At step 1024, core interface 128 determines whether all of the threads in the CTA have been launched. If not, then at step 1026, core interface 128 increments the P thread IDs to generate thread IDs for the next SIMD group, then returns to step 1018 to select a new group index GID and load the new thread IDs into local registers or other per-thread registers.

Once all threads have been launched, core interface 128 goes to the next phase (step 1030). The nature of the next phase can vary. For instance, depending on implementation, core interface 128 can return to the state phase to receive state updates to be applied to future CTAs, return to the load phase to load another CTA (assuming that core 126 has sufficient resources available to execute a second CTA concurrently with the first), or enter a waiting state until execution of the CTA by core 126 is completed.

It will be appreciated that the core interface operation described herein is illustrative and that variations and modifications are possible. Steps described as sequential may be executed in parallel, order of steps may be varied, and steps may be modified or combined.

For instance, in the launch phase, the next group of thread IDs can be determined before the core interface has determined whether they will be used.

Execution of CTAs

As described above, core 126 advantageously implements a multithreaded architecture, with SIMD groups of threads being executed in parallel and multiple SIMD groups executing concurrently. Maximum efficiency is obtained when the threads in a SIMD group do not diverge; however, in practice, threads are allowed to diverge without restriction. For instance, a program being executed by all threads in a SIMD group may include a conditional branch instruction, and the branch may be taken by some threads and not taken by others; as described above, core 126 can be configured to handle such instances. Threads may also diverge in other ways, e.g., due to conditional execution of various instructions that might be executed by some threads but not others within a SIMD group. Thus, CTA programs of arbitrary complexity can be implemented.

The CTA program may also include instructions to read from and/or write to the shared global register file 306, on-chip shared memory 308, and/or other memory such as graphics memory 124 or system memory 104 of FIG. 1. For instance, the input data set to be processed by the CTA may be stored in graphics memory 124 or system memory 104. Intermediate results may be written to global register file 306 and/or other memory such as graphics memory 124 or system memory 104 of FIG. 1, where they can be shared with other threads. Final results (output data) may be written to graphics memory 124 or system memory 104.

Instructions to access shared memory or shared global register file space advantageously identify locations to be read and/or written as a function of the thread ID. Where such an instruction is encountered, the thread reads its thread ID and computes the target address from the thread ID using the function specified in the CTA program. For instance, referring to FIG. 2C, a thread with ID (i1, i0) might be instructed to read the input data corresponding to the pixel to its right, with the address being specified as InputData[i1, i0+1]. In some embodiments, a conditional branch or conditional instruction in the CTA program might be provided to handle cases where the computed address is not within the valid range (e.g., for a thread processing a pixel at the right edge of the screen, an address such as InputData [i1, i0+1] would not be a valid pixel address).

On completion of the CTA program, the final results (output data) produced by the threads are advantageously placed in memory for use by a subsequent CTA program or made accessible to CPU 102 (FIG. 1). For example, the final instructions in a CTA program might include an instruction to write some or all of the data generated by the thread to graphics memory 124. After execution of the CTA is finished, GPU 122 may transfer the data (e.g., using a conventional DMA operation) to system memory 104, making it available to application programs executing on CPU 102. Other data transfer mechanisms may also be used. Core 126 advantageously signals core interface 128 upon completion of a CTA, so that core interface 128 can initiate execution of a next CTA, reusing the resources that became free when the first CTA was completed.

Thread Synchronization in a CTA

While different threads of a CTA can execute independently of each other, it is often useful to synchronize some or all of the threads at certain points during execution of the CTA program. For instance, if one thread produces an intermediate result that will be consumed by another thread, the two threads are advantageously synchronized at least to the extent that the producing thread is guaranteed to write the intermediate result to the designated location in shared memory before the consuming thread attempts to read it.

Various techniques may be used to synchronize threads, including conventional techniques. For example, semaphores may be used, although use of semaphores to synchronize large numbers (e.g., hundreds or thousands) of threads may result in slower processing.

In some embodiments of the present invention, a barrier synchronization technique is advantageously used to support fast synchronization of any number of CTA threads. More specifically, barrier instructions are inserted into the CTA program at points (referred to herein as "barrier points") where synchronization is desired. A thread executes a barrier instruction to indicate that it has arrived at a barrier point and waits at that point until all other participating threads have also arrived at that point, thus synchronizing the participating threads before resuming execution. Arrival of each thread (or group of threads) at a barrier point is detected, and this information is used to synchronize two or more threads (or groups of threads). In one embodiment, execution of barrier instructions, i.e., arrival of threads (or SIMD groups) at barrier points, is detected by issue logic 324 of instruction unit 312 of FIG. 3, which can suspend the issue of instructions to any threads that are waiting at a barrier point while continuing to issue instructions to threads that are not at a barrier point. Eventually, all relevant threads reach the barrier point, and execution of the waiting threads resumes.

Figure 11A:
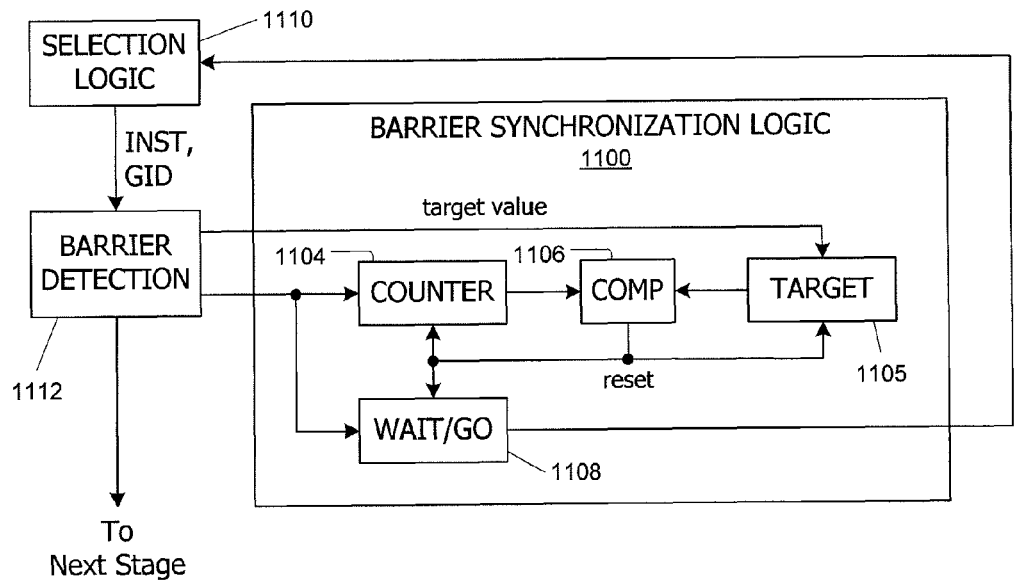
FIG. 11A is a block diagram of barrier synchronization logic 1100 according to an embodiment of the present invention.

FIG. 11A is a block diagram of barrier synchronization logic 1100 according to an embodiment of the present invention. In some embodiments, barrier synchronization logic 1100 is implemented in issue logic 324 of instruction unit 312 and synchronizes SIMD groups rather than individual threads.

As shown in FIG. 11A, instruction unit 312 also includes selection logic 1110 that selects a next instruction to issue. Selection logic 1110 may be of generally conventional design, and a detailed description is omitted as not being critical to understanding the present invention. Barrier detection circuit 1112 receives each selected instruction (INST), along with the group identifier (GID) of the SIMD group for which the instruction is being issued. If the selected instruction is a barrier instruction, barrier detection circuit 1112 directs the instruction to barrier synchronization logic 1100; otherwise, barrier detection circuit 1112 forwards the instruction to the next issue stage for eventual delivery to processing engines 302 of FIG. 3.

Barrier synchronization logic 1100 includes a counter 1104, a target register 1105, a comparison circuit 1106, and wait/go registers 1108. Counter 1104 tracks the number of threads that have arrived at a particular barrier point. Target register 1105 stores a target value, which corresponds to the number of SIMD groups that are expected to synchronize at the barrier point. In one embodiment, the target value is supplied as an immediate operand with the barrier instruction and is loaded into target register 1105 by barrier detection circuit 1112 when the first barrier instruction is received. Once loaded, the target value advantageously remains stored in target register 1105 until target register 1105 is reset.

Comparison circuit 1106 determines whether the number of arriving threads counted by counter 1104 has reached the target value stored in target register 1105. If the target value has been reached, comparison circuit 1106 issues a reset signal to counter 1104, target register 1105 and wait/go registers 1108.

Wait/go registers 1108 keep track of which thread groups have reached the barrier point and are waiting for one or more other threads to synchronize at that point. In one embodiment, wait/go registers 1108 are implemented using a single bit corresponding to each group identifier GID; the bit is set to a "wait" state (e.g., logic high) when the corresponding SIMD group is waiting at the barrier point to synchronize with one or more other SIMD groups and to a "go" state (e.g., logic low) when the corresponding SIMD group is not waiting at the barrier point.

In operation, when barrier synchronization logic 1100 receives a first barrier instruction, the target value is loaded into target register 1105. For every barrier instruction (including the first), counter 1104 is incremented. In addition, if the barrier instruction indicates that the SIMD group is to wait for synchronization, the bit corresponding to group GID is set to the wait state in wait/go registers 1108. Wait/go registers 1108 are advantageously read by selection logic 1110, and selection logic 1110 does not select instructions for SIMD groups whose wait/go bits are in the wait state, thereby suspending execution of instructions for such groups. Selection logic 1110 may continue to select instructions for other SIMD groups for execution; depending on the implementation of selection logic 1110 and the number of active thread groups, few or no processing cycles are wasted while some SIMD groups are waiting at a barrier point.

Comparison circuit 1106 compares the current value in counter 1104 to the target value stored in register 1105. If the current value matches the target value, then the threads are properly synchronized and execution of any waiting threads can resume. Accordingly, comparison circuit 1106 generates a reset signal. The reset signal resets counter 1104 to zero, resets target register 1105 to an "unloaded" state (so that a new target value can be read in when the next barrier instruction is encountered), and resets wait/go registers 1108 such that the bits corresponding to all SIMD groups are in the go state. Selection unit 1110 thereafter resumes selecting instructions for the SIMD groups that were formerly waiting at the barrier point, allowing execution of those groups to proceed beyond the barrier point.

It will be appreciated that the barrier synchronization logic described herein is illustrative and that variations and modifications are possible. In one alternative embodiment, instead of using a counter to track the number of SIMD groups (or individual threads) that have arrived at a barrier point, an arrival register with one bit per SIMD group (or per thread) may be used. The bit for each group is set when that group arrives at the barrier point. An AND tree or other suitable logic circuitry can be used to determine whether the desired number of SIMD groups have arrived at the barrier point.

Figure 11B:
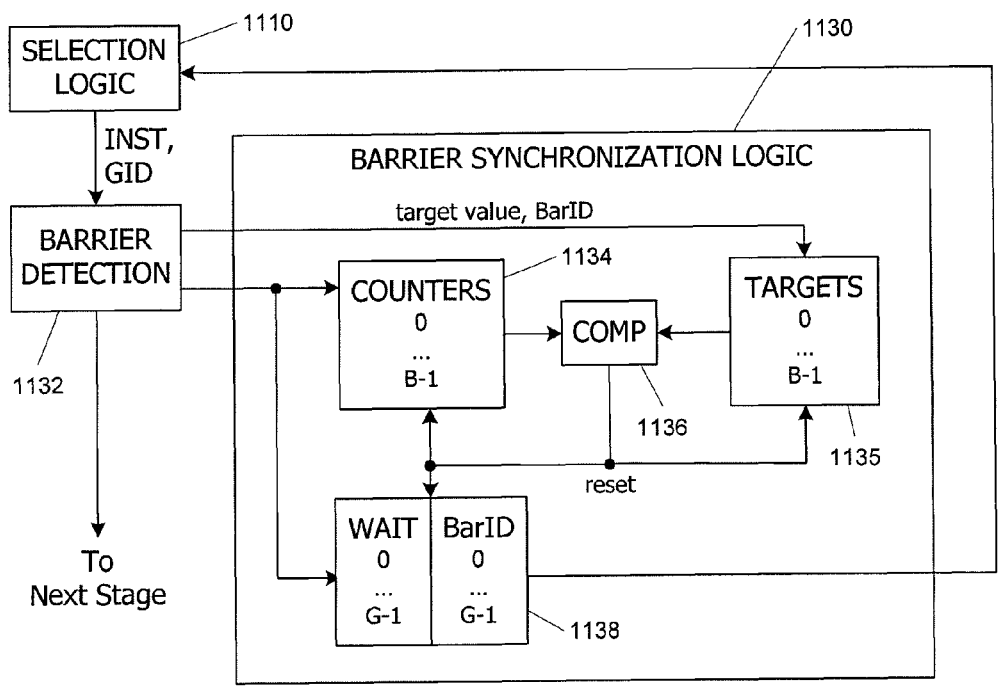
FIG. 11B is a block diagram of barrier synchronization logic that manages multiple barrier points according to an embodiment of the present invention.

In some embodiments, the issue logic can manage multiple barrier points. FIG. 11B is a block diagram of barrier synchronization logic 1130 according to an embodiment of the present invention that manages a number B of barrier points. Each SIMD group may arrive and/or wait at any one of the B barrier points, and barrier synchronization logic 1130 advantageously keeps track of which groups are waiting at which barrier points and releases each waiting group at an appropriate time.

Selection logic 1110 provides instructions to barrier detection logic 1132, as described above. Barrier detection logic 1132 is generally similar to barrier detection logic 1112 described above, except that barrier detection logic also extracts a barrier identifier (BarID) from each barrier instruction. The barrier identifier BarID, which is used to distinguish different barrier points, is advantageously provided as an immediate operand or register operand with each barrier instruction.

Barrier synchronization logic 1130 includes a set of B counters 1134, a set of B target registers 1135, a comparison circuit 1136, and a set of wait/go registers 1138. Counters 1134 track the number of threads that have arrived at each of the B barrier points. Target registers 1105 store a target value associated with each of the B barrier points; in each case, the target value corresponds to the number of SIMD groups that are expected to synchronize at that barrier point. As in barrier synchronization logic 1100, the target value can be supplied as an immediate operand with the barrier instruction and is loaded into the appropriate target register 1135 by barrier detection circuit 1132 when the first barrier instruction pertaining to a particular barrier identifier BarID is received. Each target value remains stored in target register 1135 until its barrier is reset.

Comparison circuit 1136 determines whether the number of threads counted by counter 1134 for any one of the B barrier points has reached the corresponding target value stored in target register 1105. If a target value is reached, comparison circuit 1136 issues a reset signal to counters 1134, target register 1135 and wait/go registers 1138. The reset signal in this embodiment is specific to the barrier point (BarID) for which the target value was reached.

Wait/go registers 1138 keep track of which thread groups have reached which barrier points and are waiting for synchronization to be achieved. In one embodiment, wait/go registers 1108 include a wait/go bit and a barrier identifier BarID field for each of the G SIMD groups that can concurrently execute in core 310. The wait/go bit is set to the wait state (e.g., logic high) when the corresponding SIMD group is waiting at one of the barrier points to synchronize with one or more other SIMD groups and to the go state (e.g., logic low) when the corresponding SIMD group is not waiting at any barrier point; for each group whose wait/go bit is in the wait state, the BarID field is populated with the barrier identifier of the barrier point at which the group is waiting.

In operation, when barrier synchronization logic 1130 receives a first barrier instruction pertaining to a barrier point BarID, the target value is loaded into the corresponding target register 1135. For every barrier instruction pertaining to barrier point BarID (including the first), the corresponding counter 1134 is incremented. In addition, if the barrier instruction indicates that the SIMD group is to wait for synchronization, the wait/go bit corresponding to group GID is set to the wait state in wait/go registers 1138, and the barrier identifier BarID is stored in the BarID field for that group. As described above, wait/go registers 1138 are advantageously read by selection logic 1110, and selection logic 1110 does not select instructions for SIMD groups that are in the wait state, thereby suspending execution of such groups. Selection logic 1110 may continue to select instructions for other SIMD groups.

When a barrier instruction is detected, comparison circuit 1136 compares the current value in the counter 1134 selected by barrier identifier BarID to the corresponding target value stored in the register 1135 selected by BarID. If the current value matches the target value for a barrier point BarID, comparison circuit 1136 generates a reset signal that resets the counter 1134 for that barrier point to zero, resets the target register 1135 for that barrier point to the unloaded state, and resets the wait/go registers 1108 whose BarID fields match the BarID such that for each SIMD group waiting at that barrier point, the wait/go bit is in the go state. Thus, synchronization may occur at one barrier point but not all barrier points, allowing execution of some SIMD groups to resume while other SIMD groups remain suspended at a different barrier point. Further, execution for waiting SIMD groups can be resumed quickly (e.g., within one clock cycle) after the desired synchronization is achieved.

Any number B of barriers (e.g., 2, 4, 16, or any other number) can be supported in this manner. It should be noted that where the same issue logic is used for multiple concurrently-executing CTAs, the number of different barrier points used by each CTA may limit the number of CTAs that can concurrently execute; for example, if each CTA requires four barriers and a total of 16 barriers are supported, then no more than four CTAs would be executed concurrently.

In some instances where multiple barriers are supported, a CTA program may include instructions for selecting a barrier identifier based on the thread ID. For instance, if at some point in a CTA program, even-numbered threads exchange data with other even-numbered threads while odd-numbered threads exchange data with other odd-numbered threads, there would be no need to synchronize the even-numbered threads with the odd-numbered threads. To avoid unnecessary waiting in this example, even-numbered threads and odd-numbered threads may be synchronized using two different barrier points, with each thread using its thread ID to specify one of the two barrier points depending on whether the thread ID is even or odd.

In some embodiments, the target value used to determine when synchronization is achieved may be specified as being equal to the total number of executing threads of the CTA, which can be dynamically determined by barrier synchronization logic 1100 or 1130. Although the total number of threads in a CTA can be an input parameter, as described above, in some instances, not all threads are necessarily executing at a given time; accordingly, a dynamic determination of the total is advantageous. Specifying "all executing threads" as the target value can be done, e.g., by using a predefined special value (e.g., zero) for the argument that specifies the target value or by providing a separate barrier instruction that signifies that the target value is "all executing threads." (Such an instruction would not include a target value as an argument.) Where dynamic determination of the target number is used, barrier synchronization logic 1100 or 1130 advantageously recomputes the target number from time to time so that the target remains current.

In some embodiments, barrier instructions do not necessarily require threads (or SIMD groups) to wait. For instance, "barrier arrival" instructions may be used to indicate that a thread has arrived at a barrier point but is not required to wait for synchronization at that point; "barrier arrive-and-wait" instructions may be used to indicate that a thread has arrived at the barrier point and is required to wait there for synchronization with one or more other threads. In response to a bather-arrival instruction for a SIMD group with identifier GID, barrier synchronization logic 1100 (1130) increments counter 1104 (1134) but does not set the bit corresponding to group GID in wait/go registers 1108 (1138) to the wait state; thus, the group can continue to execute. In response to the barrier arrive-and-wait instruction, barrier synchronization logic 1100 (1130) would increment the counter and would also set the bit in registers 1108 (1138) to the wait state as described above.

A barrier arrival instruction might be used in preference to a barrier arrive-and-wait instruction, e.g., where one thread produces an intermediate result to be consumed by one or more other threads but does not consume intermediate results from those threads. The producer thread would not need to wait at the barrier point for the consumer threads, but the consumer threads would all need to wait for the producer thread to arrive at the barrier point before reading the data. Thus, the program instructions for the producer thread might include a barrier arrival instruction subsequent to an instruction to write the intermediate result to a shared memory location while the program instructions for the consumer thread might include a barrier arrive-and-wait instruction prior to an instruction to read the intermediate result from the shared memory location. In one embodiment, the barrier arrival and barrier arrive-and-wait instructions can be conditional, with each thread using its thread ID to determine which (if either) to execute, depending on whether the thread ID indicates that the thread is a producer or consumer.

In the embodiment described above, the barrier instruction applies or not to a SIMD group rather than to individual threads. This simplifies the control logic (by reducing the number of threads to be counted) while supporting concurrent execution of a large number of threads. Conditional barrier instructions can be handled by treating the arrival of one thread of a SIMD group at a barrier point as indicating the arrival of all threads in the group at that point (regardless of whether this is actually the case) and by treating the arrival of one thread of the SIMD group at a "barrier wait" instruction as indicating that all threads in the group should wait (again, regardless of whether this is actually the case). With appropriate coding of conditional barrier instructions, correct behavior will result. In other embodiments, barrier instructions may be applied to each thread separately.

Barrier instructions may be inserted into a CTA program at the programmer's discretion. In general, barrier instructions that require threads to wait will tend to slow execution; accordingly, such instructions are advantageously used only to the extent that synchronization is needed in a particular CTA program. For instance, a barrier arrival instruction may follow an instruction to write data that is to be consumed by other threads, and a corresponding barrier wait instruction may precede an instruction to read the data, thereby guaranteeing that the consumer thread reads the data only after the producer thread has written it. Similarly, a barrier arrival instruction may follow an instruction to read data produced by another thread, and a barrier wait instruction may precede an instruction to overwrite data that is intended to be read by another thread, thereby guaranteeing that the consumer thread reads the data before the producer thread overwrites it. In some algorithms, threads of a CTA are both producers and consumers of data that is communicated or shared with other threads. Such CTA programs may use barrier arrive-and-wait instructions to synchronize the threads before the threads communicate with each other or before the threads read or write data in a shared memory that could be written or read by another thread.

Application Program Interface

In some embodiments, CTAs executed by GPU 122 (FIG. 1) are used to perform computations under the direction of an application program executing on CPU 102. An application program interface (API) for defining and executing CTAs is advantageously provided to allow application programmers to access CTA functionality as desired.

As is known in the art, communication between CPU 102 and GPU 122 can be managed by a driver program that executes on CPU 102. The driver program supports an application program interface (API) that defines function calls supported by GPU 122, and an application programmer can invoke the GPU functions by including suitable function calls from the API at appropriate places in the program code.

In accordance with an embodiment of the present invention, the API for a driver program for GPU 122 enables an application program to invoke the CTA-processing functions of GPU 122. The API advantageously allows the application program to define a CTA program, e.g., by reference to a location in memory where the first instruction of the CTA program is stored; this aspect of the interface can be implemented analogously to existing APIs that allow application programs to define shader programs to be executed by a GPU. Thus, an application developer may write an arbitrary CTA program to be executed as part of an application. In other embodiments, a maker of GPU 122 or a third party may provide a library of CTA programs from which application developers can select programs, and the developer may have the option of selecting a CTA program from the library or creating a custom CTA program.

The API also allows the application program to define the dimensions of a CTA, the number of CTAs to be executed, the input data set to be processed by a CTA (or multiple CTAs), and so on. The particular details of the API, such as names and parameters of particular function calls, are a matter of design choice, and persons of ordinary skill in the art with access to the present teachings will be able to create suitable APIs for a given hardware implementation.

For instance, an image processing algorithm executing on CPU 102 might require application of a convolution filter as one step in a larger process. Via API function calls, the application programmer can define a CTA that applies the convolution filter (e.g., as described below) and call a function that invokes CTA processing at appropriate points in the program. It should be noted that the application programmer does not need to know details of where or how the CTA will be executed, only that the CTA will be executed and that resulting data will be written to a well-defined and accessible storage location, such as an area in system memory 104 specified by the application program.

In some instances, the application program executing on CPU 102 might need to wait for GPU 122 to finish processing one or more CTAs, e.g., if the data generated by the CTA(s) is needed for a subsequent processing step, and this can introduce some latency. (Such latency will generally be less than the latency associated with sequential processing techniques.) In some instances it may be possible to hide some or all of this latency through suitable sequencing or scheduling of program instructions, e.g., by arranging the program sequence so that the CTA is processed by GPU 122 while CPU 102 performs other functions that do not rely on the CTA data. It will be recognized that the extent to which latency can be hidden through software techniques will depend on the particular application.

Executing Multiple CTAs Concurrently

In instances where an application program creates and executes multiple CTAs, processing all of the CTAs using a single core 126 may result in significant latency. For example, referring to FIG. 2C, the 2-D tile-based HDTV image filter includes approximately 8K tiles and thus about 8K CTAs per frame. Executing 8K CTAs sequentially can require significant time even if each CTA entails a relatively small amount of work. As noted above, in some instances it may be possible to hide some or all of the latency via hardware parallelism and/or software techniques.

Another option is to increase the available processing capacity, e.g., by providing larger cores and/or more parallel cores so that more CTAs can be executed concurrently.

For purposes of the present description, "size" of a core refers to the maximum number of threads that the core can execute concurrently. For instance, core 126 described above can execute up to P*G threads concurrently. If each CTA has fewer than P*G/2 threads, core 126 may be able to execute two (or more) different CTAs concurrently. It should be noted that thread IDs may be duplicated in different CTAs, but CTA identifiers (described above) can be used to distinguish threads in different CTAs, e.g., so that they do not write to the same global register or memory location. Increasing P and/or G can increase the number of CTAs that a single core 126 can process concurrently.

In some instances, factors other than the number of threads may limit the number of concurrent CTAs that can coexist in core 126. For example, the global and local register files would need to provide enough space for all of the CTAs. In embodiments where the register file requirements for a CTA are specified as state parameters, core interface 128 can dynamically determine, based on the number of CTAs already executing in core 126, whether core 126 has sufficient resources available to execute another CTA.

In some embodiments, concurrent CTAs in core 126 may be required to have the same state parameters. In other embodiments, core interface 128 and/or core 126 can be configured to manage multiple versions of state information so that each CTA is executed with the correct state parameters. Further, core interface 128 might also be modified to compute the available resources (register file space, SIMD groups, etc.) based on the resources being used by each executing CTA and the requirements for the next CTA, in order to determine whether core 126 has sufficient available resources to execute the next CTA.

Figure 12:
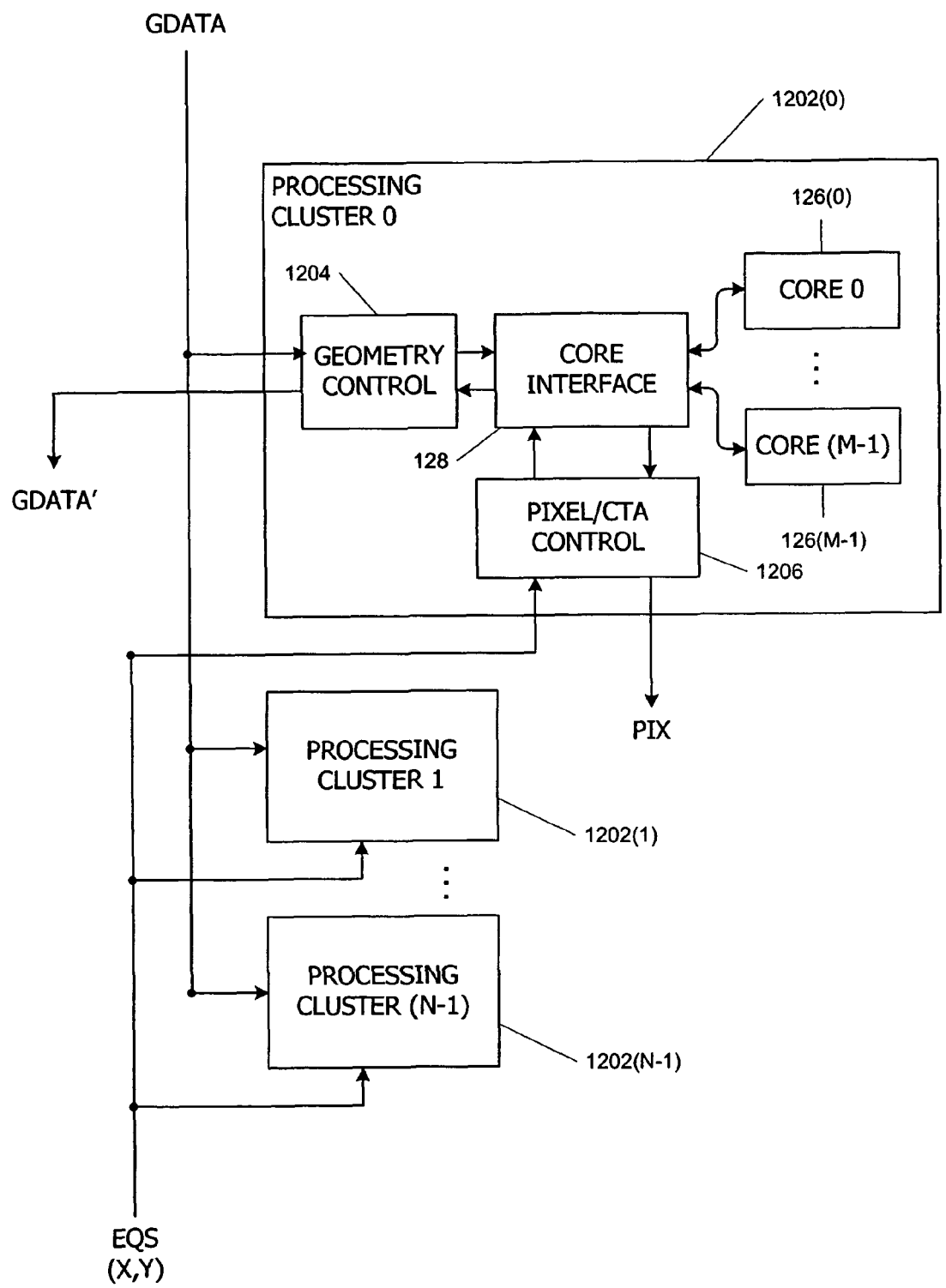
FIG. 12 is a block diagram of an arrangement of multiple cores within a graphics processor according to an embodiment of the present invention.

Increases in CTA throughput can also be obtained by providing a processor with multiple cores 126. In one embodiment, GPU 122 includes multiple cores 126 that support concurrent execution of a large number of threads in parallel. FIG. 12 is a block diagram of an arrangement of multiple cores 126 within GPU 122 according to an embodiment of the present invention.

In this embodiment, GPU 122 includes some number (N) of processing clusters 1202. Any number N (e.g., 1, 4, 8, or any other number) of processing clusters may be provided. In FIG. 12, one processing cluster 1202 is shown in detail; it is to be understood that other processing clusters 1202 can be of similar or identical design.

Each processing cluster 1202 includes a core interface 128, which may be generally similar to core interface 128 described above. Core interface 128 controls a number (M) of cores 126, each of which may be generally similar to core 126 described above. Any number M (e.g., 1, 2, 4 or any other number) of cores 126 may be connected to a single core interface. In one embodiment, core interface 128 loads and launches threads (e.g., threads of a CTA) for one core 126 at a time; as soon as all threads for one CTA have been launched, core interface 128 can proceed to launch other threads for the same core 126 or a different core 126. The number M of cores 126 managed by a single core interface 128 is a matter of design choice and may depend, e.g., on the expected duty cycle of core interface 128.

It will be appreciated that this configuration supports a large number of concurrent threads. For instance, where each core 126 can execute up to P*G threads, the total number of threads is N*M*P*G. This number can be quite large, e.g., several thousand concurrent threads in one embodiment.

In the embodiment shown in FIG. 12, processing clusters 1202 are designed to process vertex and/or pixel data during rendering operations of GPU 122, and execution of CTAs for general-purpose computation is supported by leveraging the existing rendering hardware to the extent possible. Accordingly, in this embodiment, core interface 128 can receive control signals and data from a geometry controller 1204 or a pixel/CTA controller 1206. During rendering operations, geometry controller 1204 receives geometry data (GDATA) from the rendering pipeline (not explicitly shown) of GPU 122 and forwards the data to core interface 128, which controls execution of vertex and/or geometry shader programs on the geometry data. The processed geometry data (GDATA') is returned to the rendering pipeline via geometry controller 1204.

During rendering operations, pixel/CTA controller 1206 also receives pixel-processing input data (e.g., attribute equations EQS for a primitive and (X,Y) coordinates for pixels covered by the primitive) from the rendering pipeline of GPU 122 and forwards the data to core interface 128, which also controls execution of pixel shader programs on the data. The processed pixel data (PIX) is returned to the rendering pipeline via pixel/CTA controller 1206.

In this embodiment, during general-purpose computation operations using CTAs, pixel/CTA controller 1206 is used to provide a path for CTA-related state information, input data and commands to reach core interface 128.

CTAs that are to be processed can be distributed to processing clusters 1202 or cores 126 in various ways, including conventional techniques for distributing work among processing cores. In one embodiment, a source of pixel-processing data within the rendering pipeline is also configured to receive information from each processing cluster 1202 indicating the availability of that processing cluster 1202 (or individual cores 126) to handle additional CTAs. The data source selects a destination processing cluster 1202 or core 126 for each CTA. In another embodiment, CTA data and commands are forwarded from one processing cluster 1202 to the next until a processing cluster 1202 with capacity to process the CTA accepts it. Similar techniques can also be used during rendering operations to distribute vertex, geometry, and/or pixel processing work among cores 126.

It should be noted that increasing the number of cores 126 generally increases the number of CTAs that can be processed in parallel but does not affect the size limit of a CTA. Because threads in a CTA are expected to share data with each other, each CTA is advantageously executed within a single core 126.

It will be appreciated that the multi-core structure described herein is illustrative and that variations and modifications are possible. Any number of processing clusters may be provided, and each processing cluster may include any number of cores. Further, rather than reusing the pixel path (or the geometry path) for controlling CTA operations, a dedicated CTA control path might be provided.

Examples of Data-Parallel Decompositions

As noted above, CTAs may advantageously be used to implement any part of a data processing algorithm that lends itself to a data-parallel decomposition. By way of illustration, a few examples will now be described with reference to various well-known algorithms. Those skilled in the art will appreciate that CTAs may be employed in a wide range of other contexts.

The Fast Fourier Transform (FFT) algorithm is a well-known example of a data-parallel decomposition. As is generally known, discrete Fourier transforms can be computed as a dot products of an N-component sample vector with each of N basis vectors, requiring $O(N^2)$ multiplications and additions. To reduce the computational burden to O(N log N), the FFT algorithm employs a data-parallel decomposition: the well-known "butterfly" calculations.

In accordance with an embodiment of the present invention, FFT butterfly calculations are advantageously implemented in a CTA. Each thread starts by reading its own input value, then reads an input value of another thread (determined based on thread IDs) and performs two multiplications and two additions to arrive at the next intermediate value. The next intermediate value is written back to the global register file so that it can be shared with another thread, and so on. At each FFT stage, the CTA threads synchronize and wait for other threads' intermediate values to be written before reading those intermediate values.

Matrix algebra provides many more examples of data parallel decompositions. In matrix multiplication, for instance, each element of a product matrix is determined by multiplying each element of a row of one matrix by a corresponding element of a column of the other matrix and summing the products. CTAs can be used for this process, as well as for more complex operations such as linear equation solving (which generally requires inverting a matrix). In this application, multidimensional thread IDs advantageously support either row-major or column-major addressing in a natural fashion, which facilitates operations that require a matrix transpose.

Convolution filters can also be implemented using a data-parallel decomposition. As is known in the art, convolution filters are often employed in various types of signal processing to reduce noise and other artifacts. In the case of image processing, for instance, a two-dimensional kernel may be defined, and a value for a particular pixel is determined by convolving the kernel with the pixel and its neighbors. CTAs can be used to convolve multiple pixels with the same kernel in parallel, and multiple CTAs can be used to apply the filter kernel to different regions of the image in parallel. More generally, a CTA can implement a convolution filter in an arbitrary number of dimensions, without regard to the particular application for which convolution filtering is being employed.

Separable filters, a special case of convolution filters, can also be implemented using a data parallel decomposition. A two-dimensional (N×N) separable filter is a convolution filter in which the filter can be expressed in terms of a "row" vector and a "column" vector. The row vector is applied to each row as a convolution filter with a kernel that is one row high and N columns wide, and the column vector is applied to the row-filter results as a convolution filter with a kernel that is one column wide and N rows high. A CTA for a separable filter can be configured with N threads. Each thread applies the row vector to one of N rows, writing its row result to shared memory. After each CTA thread has written its row result to shared memory, it waits for the other CTA threads to write their row results. Barrier synchronization, as described above, or other synchronization techniques may be used to ensure that a row result is available in the shared memory before any thread attempts to read that row result. Thereafter, each thread uses the row results from shared memory to apply the column vector to one of N columns.

Embodiments of the present invention allow an application programmer to define a data parallel decomposition suitable for a particular general-purpose computing application and to control the extent and manner of sharing of data between various threads. The programmer also defines dimensions of one or more CTAs that are to execute the algorithm and supplies the input data. The manner in which the CTA is executed is advantageously transparent to the programmer. In particular, the programmer is not required to know details of how the processing hardware executes a CTA, such as whether there is SIMD parallelism, the number of threads in a SIMD group, and so on.

CTAs can be executed on parallel processors, multi-threaded processors, vector processors, or any other processor capable of exploiting the explicit parallelism made available by the concurrent threads of the CTA and the parallelism made available by concurrent execution of multiple CTAs. CTAs can also be executed on sequential processors such as conventional CPUs by exploiting software techniques such as thread scheduling, although performance in such systems might not be as high as in systems that can leverage CTA parallelism.

In some embodiments, a CTA provides a flexible, general-purpose computational capacity in a GPU that may be used for computations in any field, including but not limited to bioinformatics, seismic signal processing, modeling and simulation, matrix algebra, physics, chemistry, image processing, supercomputing, and so on.

Further Embodiments

While the invention has been described with respect to specific embodiments, one skilled in the art will recognize that numerous modifications are possible. For instance, as noted above, the core size, number of cores and the like can be varied. The number and maximum size of various CTA dimensions can also be varied, and a CTA may be made as large as desired provided that any potential data sharing among the threads can be supported.

Embodiments described herein may make reference to all threads of a CTA being executed concurrently. As used herein, "concurrently" means that at least a portion of the execution of each thread overlaps in time with a portion of the execution of another thread; it is not required that all threads (or even any two threads) begin or end their execution at the same time. In some embodiments, concurrent threads of a CTA may be executed in parallel to reduce the CTA execution time, and multiple CTAs may be executed in parallel to reduce the execution time of a multi-CTA workload.

In some embodiments using a GPU, CTA threads and rendering threads can coexist in the same processor, e.g., in different cores or in the same core. Further, in systems with multiple GPUs, one GPU may be used for rendering images while another is used for general-purpose computations including CTAs. Alternatively, each GPU may be assigned a different portion of a general-purpose computation; allowing multiple GPUs to execute CTAs in parallel further increases the number of CTAs that can be executed in parallel.

Further, while the embodiments described herein refer to processing cores of a GPU, it will be appreciated that multi-threaded or parallel cores (with or without SIMD instruction issue) can be provided in other processors, including general-purpose processors such as CPUs, as well as math or physics co-processors, and so on. CTAs as described herein may be executed by any processing core that supports sharing of data between threads and the ability to supply each individual thread with its own unique identifier.

Thus, although the invention has been described with respect to specific embodiments, it will be appreciated that the invention is intended to cover all modifications and equivalents within the scope of the following claims.

What is claimed is:

1. A computer-implemented method for processing data, the method comprising:
    defining, in a processor, a thread array having a plurality of threads, each thread configured to execute a same program on a subset of an input data set;
    assigning, by the processor, each of the threads in the thread array a unique thread identifier value to be used to determine the subset of the input data set to be processed by each respective thread, wherein each unique thread identifier value is unique within the thread array; and
    executing, by the processor, the plurality of threads in the thread array concurrently with each other, wherein during execution, each thread uses the unique thread identifier value assigned thereto as an input to compute at least one program-specified function of the unique thread identifier value,
    wherein the plurality of threads includes a first thread configured to execute the same program on a first subset of the input data set and a second thread configured to execute the same program on a second subset of the input data set, and
    wherein data in the first subset overlaps with the second subset.

2. The method of claim 1 further comprising:
    loading the input data set into a shared memory accessible to all of the plurality of threads,
    wherein during the act of executing the plurality of threads, the thread identifier value assigned to a thread is used to determine a location in the shared memory of input data to be read.

3. The method of claim 1 wherein each thread uses the unique thread identifier value assigned thereto to determine a subset of an output data set to produce.

4. The method of claim 1 further comprising, during the act of executing the plurality of threads, sharing an intermediate result from one of the plurality of threads with another of the plurality of threads based on the respective thread identifier values assigned to the two threads.

5. The method of claim 1 wherein the at least one function includes a function to write data to a location in a shared memory, the location being computed using the thread identifier value.

6. The method of claim 1 wherein the at least one function includes a function to read data from a location in a shared memory, the location being computed using the thread identifier value.

7. The method of claim 1 wherein the program represents a unit in a data-parallel decomposition of a data-processing algorithm.

8. The method of claim 1 wherein the processor is a graphics processor.

9. A processor comprising:
    a processing core including:
        one or more processing engines configured to execute a plurality of threads concurrently; and
        a shared memory communicably coupled to the one or more processing engines; and
    core interface logic coupled to the processing core, the core interface logic including:
        a launch module configured to initiate concurrent execution by the processing core of a plurality of threads of a thread array, each thread of the thread array being configured to execute a same program on an input data set,
        the launch module being further configured to assign a unique thread identifier value, wherein each unique thread identifier value is unique within the thread array, to each of the threads prior to instructing the processing core to initiate execution of the threads,
    wherein during execution, each thread of the thread array uses the unique thread identifier value assigned thereto as an input to determine a subset of the input data set to process and to compute at least one program-specified function of the unique thread identifier value,
    wherein the plurality of threads includes a first thread configured to execute the same program on a first subset of the input data set and a second thread configured to execute the same program on a second subset of the input data set, and
    wherein data in the first subset overlaps with the second subset.

10. The processor of claim 9 wherein the processing core includes a local register file having a plurality of entries allocated to each of the plurality of threads, and wherein the thread identifier value assigned to each thread is stored in one of the local register file entries allocated to that thread.

11. The processor of claim 9 wherein the core interface logic further includes:
    a state module configured to receive and store state information defining the thread array, the state information including array size information for the thread array,
    wherein the launch module is further configured to determine the unique thread identifier value for each thread of the thread array based on the array size information stored in the state module.

12. The processor of claim 9 wherein the processor is a graphics processor and wherein the processing core is further configurable to execute a shader program associated with rendering of images.

13. A method for processing an input data set using a processor configured to execute a plurality of threads concurrently, the method comprising:
    communicating to the processor information defining a thread array having a plurality of threads, each thread being identified by a unique thread identifier to be used to determine respective portions of an input data set to be processed by each respective thread, wherein each unique thread identifier value is unique within the thread array;
    communicating to the processor a same program to be executed by each thread of the thread array on at least a portion of the input data set stored in a shared memory to produce at least a portion of an output data set; and
    communicating to the processor an instruction to begin concurrently executing all of the threads of the thread array to process the input data set in the shared memory to produce the output data set,
    wherein the plurality of threads includes a first thread configured to execute the same program on a first portion of the input data set and a second thread configured to execute the same program on a second portion of the input data set, and
    wherein data in the first portion overlaps with the second portion.

14. The method of claim 13 wherein the processor is a graphics processor.

15. The method of claim 13 wherein the shared memory is internal to the processor, the method further comprising:
communicating to the processor an instruction to transfer result data generated by executing all of the threads of the thread array to a memory location external to the processor.

16. The method of claim 13 wherein the unique thread identifier is a multidimensional identifier.

17. The method of claim 13 wherein each of the threads of the thread array executes the same program on a different portion of the input data set.

18. The method of claim 13 wherein each of the threads of the thread array produces a different portion of the output data set.

* * * * *